US009477591B2

(12) United States Patent
Jannyavula Venkata et al.

(10) Patent No.: US 9,477,591 B2
(45) Date of Patent: Oct. 25, 2016

(54) MEMORY ACCESS REQUESTS IN HYBRID MEMORY SYSTEM

(75) Inventors: Sumanth Jannyavula Venkata, Shakopee, MN (US); James David Sawin, Sterling, MA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 499 days.

(21) Appl. No.: 13/543,100

(22) Filed: Jul. 6, 2012

(65) Prior Publication Data

US 2014/0013026 A1    Jan. 9, 2014

(51) Int. Cl.
| | |
|---|---|
| G06F 12/00 | (2006.01) |
| G06F 12/02 | (2006.01) |
| G06F 12/08 | (2016.01) |
| G06F 12/10 | (2016.01) |
| G06F 3/06 | (2006.01) |

(52) U.S. Cl.
CPC ........... *G06F 12/0246* (2013.01); *G06F 3/068* (2013.01); *G06F 3/0614* (2013.01); *G06F 3/0659* (2013.01); *G06F 12/0804* (2013.01); *G06F 12/0873* (2013.01); *G06F 12/0897* (2013.01); *G06F 12/10* (2013.01); *G06F 2212/1016* (2013.01); *G06F 2212/2024* (2013.01); *G06F 2212/222* (2013.01); *G06F 2212/7201* (2013.01)

(58) Field of Classification Search
CPC . G06F 12/0246; G06F 12/0873; G06F 12/10
USPC ..................................................... 711/3, 103
See application file for complete search history.

(56) References Cited

U.S. PATENT DOCUMENTS

| | | | |
|---|---|---|---|
| 4,899,230 A | | 2/1990 | Sherritt |
| 5,274,768 A | * | 12/1993 | Traw .................. H04Q 11/0478 370/397 |
| 5,420,998 A | * | 5/1995 | Horning ........................ 711/113 |
| 5,644,789 A | | 7/1997 | Matthews et al. |
| 6,549,992 B1 | * | 4/2003 | Armangau .......... G06F 11/1456 707/999.202 |

(Continued)

FOREIGN PATENT DOCUMENTS

EP    1890236    2/2008

OTHER PUBLICATIONS

Hallnor et al., "A Fully Associative Software-Managed Cache Design", ISCA '00 Proceedings of the 27th Annual International Symposium on Computer Architecture, 2000, pp. 107-116.

(Continued)

*Primary Examiner* — Prasith Thammavong
(74) *Attorney, Agent, or Firm* — Hollingsworth Davis, LLC

(57) ABSTRACT

Incoming memory access requests are routed in a set of incoming queues, the incoming memory access requests comprise a range of host logical block addresses (LBAs) that correspond to a memory space of a primary memory. The host LBA range is mapped to clusters of secondary memory LBAs, the secondary memory LBAs corresponding to a memory space of a secondary memory. Each incoming memory access request queued in the set of incoming queues is transformed into one or more outgoing memory access requests that include a range of secondary memory LBAs or one or more clusters of secondary memory LBAs. The outgoing memory access requests are routed in a set of outgoing queues. The secondary memory is accessed using the outgoing memory access requests.

15 Claims, 16 Drawing Sheets

(56) References Cited

U.S. PATENT DOCUMENTS

| | | |
|---|---|---|
| 6,948,015 B2 | 9/2005 | Ogasawara et al. |
| 7,181,578 B1 | 2/2007 | Guha et al. |
| 7,305,526 B2 | 12/2007 | Benhase et al. |
| 7,769,970 B1 | 8/2010 | Yeh et al. |
| 7,996,642 B1 | 8/2011 | Smith |
| 8,180,964 B1 | 5/2012 | Koh et al. |
| 8,195,881 B2 | 6/2012 | Bohn et al. |
| 8,341,339 B1 | 12/2012 | Boyle et al. |
| 8,489,820 B1 | 7/2013 | Ellard |
| 8,583,879 B2 | 11/2013 | Na et al. |
| 2002/0002655 A1 | 1/2002 | Hoskins |
| 2002/0176430 A1* | 11/2002 | Sangha ............ H04L 49/90 370/412 |
| 2003/0105937 A1 | 6/2003 | Cooksey et al. |
| 2003/0105938 A1 | 6/2003 | Cooksey et al. |
| 2003/0105940 A1 | 6/2003 | Cooksey et al. |
| 2003/0196042 A1 | 10/2003 | Hopeman et al. |
| 2003/0200393 A1 | 10/2003 | Cornaby et al. |
| 2004/0123043 A1 | 6/2004 | Rotithor et al. |
| 2005/0108491 A1 | 5/2005 | Wong et al. |
| 2005/0114606 A1 | 5/2005 | Matick et al. |
| 2005/0172074 A1 | 8/2005 | Sinclair |
| 2006/0184949 A1 | 8/2006 | Craddock et al. |
| 2007/0022241 A1* | 1/2007 | Sinclair ............ 711/100 |
| 2007/0136523 A1 | 6/2007 | Bonella et al. |
| 2007/0250665 A1 | 10/2007 | Shimada |
| 2007/0288692 A1 | 12/2007 | Bruce et al. |
| 2008/0162849 A1 | 7/2008 | Savagaonkar et al. |
| 2008/0209131 A1 | 8/2008 | Kornegay et al. |
| 2009/0055595 A1 | 2/2009 | Gill et al. |
| 2009/0089501 A1 | 4/2009 | Ahn et al. |
| 2009/0106481 A1 | 4/2009 | Yang et al. |
| 2009/0157918 A1 | 6/2009 | Jin et al. |
| 2009/0193193 A1 | 7/2009 | Kern |
| 2009/0300628 A1 | 12/2009 | Patil et al. |
| 2010/0023682 A1 | 1/2010 | Lee |
| 2010/0095053 A1 | 4/2010 | Bruce et al. |
| 2010/0115172 A1 | 5/2010 | Gillingham et al. |
| 2010/0217952 A1 | 8/2010 | Iyer et al. |
| 2010/0325352 A1 | 12/2010 | Schuette et al. |
| 2011/0055458 A1 | 3/2011 | Kuehne |
| 2011/0145489 A1 | 6/2011 | Yu et al. |
| 2012/0191936 A1 | 7/2012 | Ebsen et al. |
| 2012/0210041 A1 | 8/2012 | Flynn et al. |
| 2012/0266175 A1* | 10/2012 | Zheng ............ 718/103 |
| 2012/0311237 A1 | 12/2012 | Park |
| 2012/0311269 A1 | 12/2012 | Loh et al. |
| 2012/0317364 A1 | 12/2012 | Loh |
| 2013/0024625 A1 | 1/2013 | Benhase et al. |
| 2013/0179486 A1 | 7/2013 | Lee et al. |
| 2013/0191601 A1 | 7/2013 | Peterson et al. |
| 2013/0212319 A1 | 8/2013 | Hida et al. |
| 2013/0246688 A1 | 9/2013 | Kanno et al. |
| 2013/0268728 A1 | 10/2013 | Ramanujan et al. |
| 2013/0339617 A1 | 12/2013 | Averbouch et al. |
| 2014/0013025 A1 | 1/2014 | Venkata |
| 2014/0013026 A1 | 1/2014 | Venkata et al. |
| 2014/0013027 A1 | 1/2014 | Venkata et al. |
| 2014/0013047 A1 | 1/2014 | Sawin et al. |
| 2014/0013052 A1 | 1/2014 | Sawin et al. |
| 2014/0013053 A1 | 1/2014 | Sawin et al. |
| 2014/0207997 A1 | 7/2014 | Peterson et al. |
| 2014/0241092 A1 | 8/2014 | Ha |
| 2014/0281134 A1 | 9/2014 | Eitan et al. |
| 2015/0033226 A1 | 1/2015 | Phelan et al. |
| 2015/0058525 A1 | 2/2015 | Venkata |
| 2015/0058526 A1 | 2/2015 | Venkata |
| 2015/0058527 A1 | 2/2015 | Venkata |
| 2015/0058683 A1 | 2/2015 | Venkata et al. |

OTHER PUBLICATIONS

File History for U.S. Appl. No. 13/543,303 retrieved from U.S. Patent and Trademark Office PAIR System on Feb. 9, 2015, 232 pages.

File History for U.S. Appl. No. 13/543,079 retrieved from U.S. Patent and Trademark Office PAIR System on Feb. 9, 2015, 89 pages.

File History for U.S. Appl. No. 13/543,303 as retrieved from U.S. Patent and Trademark Office PAIR System on Sep. 10, 2015, 294 pages.

File History for U.S. Appl. No. 13/543,079 as retrieved from U.S. Patent and Trademark Office PAIR System on Sep. 21, 2015, 147 pages.

File History for U.S. Appl. No. 13/971,770 as retrieved from U.S. Patent and Trademark Office PAIR System on Sep. 21, 2015, 133 pages.

Office Action dated Mar. 29, 2016 for U.S. Appl. No. 13/971,778, 22 pages.

File History for U.S. Appl. No. 13/543,079 as retrieved from U.S. Patent and Trademark Office PAIR System on Mar. 7, 2016, 183 pages.

File History for U.S. Appl. No. 13/543,303 as retrieved from U.S. Patent and Trademark Office PAIR System on Mar. 7, 2016, 375 pages.

File History for U.S. Appl. No. 13/971,770 as retrieved from U.S. Patent and Trademark Office PAIR System on Mar. 7, 2016, 174 pages.

File History for U.S. Appl. No. 13/971,773 as retrieved from U.S. Patent and Trademark Office PAIR System on Mar. 7, 2016, 144 pages.

File History for U.S. Appl. No. 13/971,778 as retrieved from U.S. Patent and Trademark Office PAIR System on Mar. 7, 2016, 150 pages.

Office Action dated Aug. 12, 2016 from patent application No. 13/971,778, 23 pages.

* cited by examiner

SSD LBA SPACE

200

MEMORY ACCESS REQUESTS IN HYBRID MEMORY SYSTEM

SUMMARY

According to some embodiments, a memory device includes a hybrid controller configured to manage data transfers between a host processor and a secondary memory. The secondary memory is configured to serve as a cache for a primary memory that includes a memory space corresponding to host logical block addresses (LBAs). The hybrid controller is arranged to receive incoming memory access requests from the host processor, the memory access requests including a range of host LBAs; route the incoming memory access requests to a set of incoming queues; map the range of host LBAs into clusters of secondary memory LBAs; transform each incoming memory access requests into one or more outgoing memory access requests, each outgoing memory access request including a range or cluster of secondary memory LBAs; route the outgoing memory access requests from the incoming queues into a set of outgoing queues; and access the secondary memory using the outgoing memory access requests.

Some embodiments involve a method of operating a hybrid memory system that includes a primary memory and a secondary memory. Incoming memory access requests are routed in a set of incoming queues, the incoming memory access requests comprise a range of host logical block addresses (LBAs) that correspond to a memory space of the primary memory. The host LBA range is mapped to clusters of secondary memory LBAs, the secondary memory LBAs corresponding to a memory space of the secondary memory. Each incoming memory access request queued in the set of incoming queues is transformed into one or more outgoing memory access requests. The outgoing memory access requests include a range of secondary memory LBAs or one or more clusters of secondary memory LBAs. The outgoing memory access requests are routed in a set of outgoing queues. The secondary memory is accessed using the outgoing memory access requests.

Some embodiments involve a controller for a hybrid memory system, the controller comprising a hybrid controller configured to manage data transfers between a host processor and a flash memory, the flash memory configured to serve as a cache for a magnetic disk. The hybrid controller includes multiple layers including a flash control and transfer management (FCTM) layer, the FCTM layer is configured to:
  receive the incoming memory access requests from a higher layer of the hybrid controller;
  route the incoming data access requests in a set of incoming queues;
  transform each of the memory access requests from the set of incoming queues into a plurality of outgoing memory access requests;
  route the plurality of outgoing memory access requests in a set of outgoing queues; and
  send the outgoing memory access requests to a lower layer of the hybrid controller.

These and other features and aspects of the various embodiments disclosed herein can be understood in view of the following detailed discussion and the accompanying drawings.

DETAILED DESCRIPTION

Some memory devices use at least two types of memory in a hybrid or tiered memory system, where at least one type of memory is used as a primary memory and at least one other type of memory is used as a secondary memory that operates as a cache. The primary memory may have greater storage capacity but slower access times than the secondary memory, for example. In this arrangement, the secondary memory can serve as a read cache and/or a write cache for the primary memory. One example of such a tiered memory device is a hybrid drive, in which the primary memory may comprise nonvolatile memory such as magnetic disk, magnetic tape, and/or optical disk and the secondary memory may comprise solid state flash memory, and/or the secondary memory may be a nonvolatile or volatile memory with or without battery backup. Note that the terms "primary memory" and "secondary memory" are used herein to denote differences in memory (e.g., usage, capacity, performance, memory class or type, etc.) and not necessarily order or preference. Furthermore, although examples provided herein refer to the primary memory as magnetic disk and to secondary memory as flash memory, the disclosed approaches are applicable to any types of primary and secondary memory.

Figure 1A:
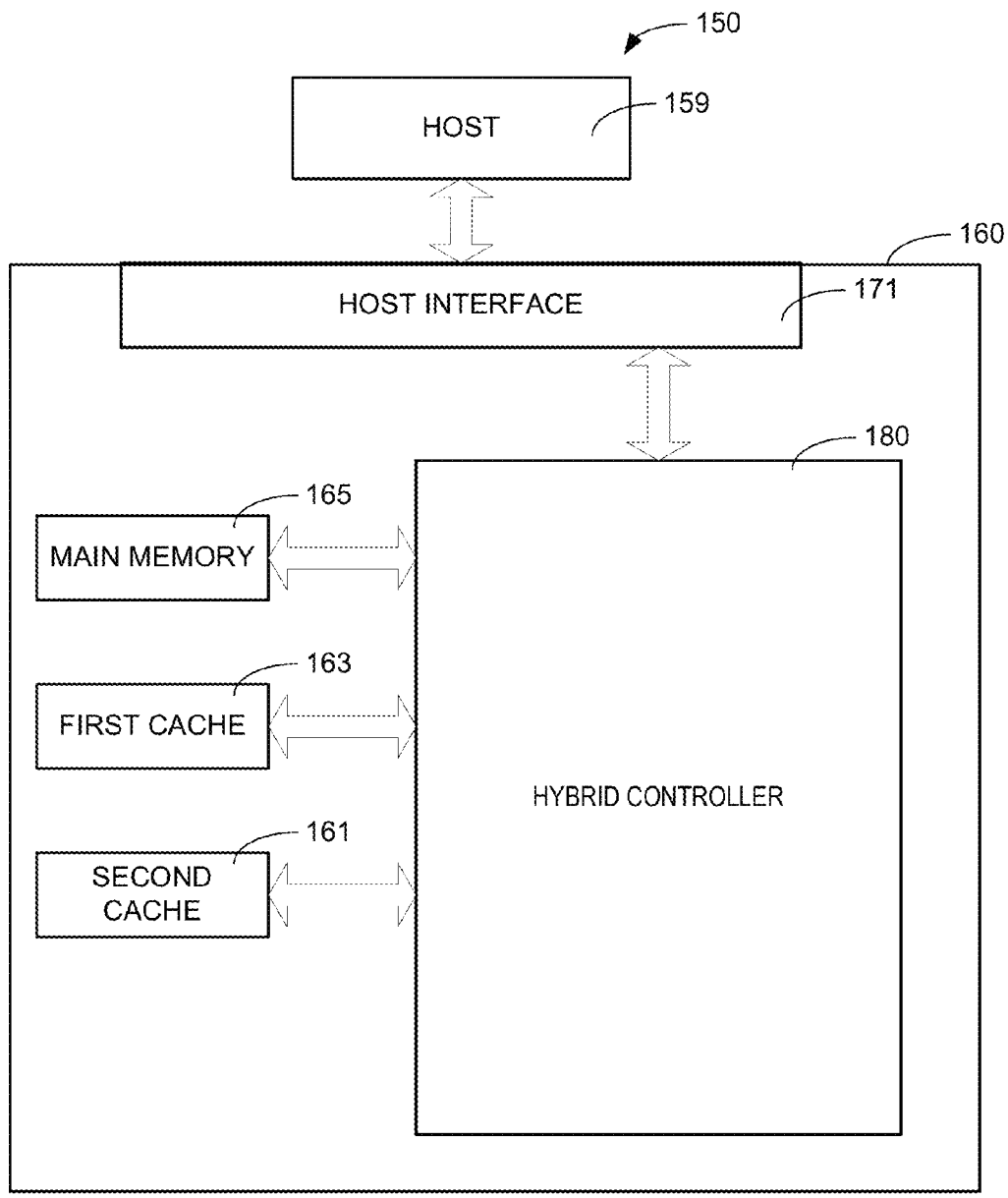
FIG. 1A is a block diagram of a hybrid memory system configured to manage memory access requests in accordance with some embodiments.

FIG. 1A is a diagram of a system 150 that includes a hybrid memory 160 comprising a number of memory components including a main memory 165, a first cache 163 and a second cache 161. The hybrid memory 160 is coupled to a host processor 159 through a host interface 171. The host interface 171 communicatively couples the host processor 159 to a hybrid controller 180. The first cache 163 and the second cache 161 can be configured to temporarily store data to enhance throughput to the main memory 165. The main memory 165 includes a memory space that corresponds to a number of memory sectors, each sector addressable using a unique a logical block address (LBA). The sectors of the main memory 165 are directly accessible by the host 159 using the LBAs, and thus the corresponding LBAs of the main memory are referred to herein as host LBAs.

The host 159 sends memory access requests to the hybrid drive 160 to read or write data. The memory access requests may specify a host LBA range used for the operation of the memory access request. For example, a memory access request from the host 159 may request that a host LBA range be written to the hybrid drive 160 and/or a memory access request may request that a host LBA range be read from the hybrid drive 160. The memory access requests are managed by the hybrid controller 180 to cause data to be written to and/or read from the hybrid drive with optimal efficiency. The second cache 161 in this example may optionally be read-only, in that only data marked for read operations by the host 159 are placed in the second cache 161. In such a configuration, data marked for writing are sent directly to the main storage 165, either directly or via the first cache 163.

According to some embodiments, the hybrid memory device 160 (also denoted hybrid drive) may be implemented using a controller configured as a hierarchy of abstraction layers. Pairs of the abstraction layers are communicatively coupled through application programming interfaces (APIs). The organization of the hybrid controller 180 into abstraction layers to some extent allows each layer to work relatively independently and/or can reduce potential conflicts that arise from processing multiple threads of execution. For purposes of discussion, some examples provided below are based on the use of a magnetic disk as the main memory, dynamic random access memory as the first (or primary) cache, and solid state flash memory as the second (or secondary) cache. It will be apparent to those skilled in the art that the various memory components 161, 163, 165 are not restricted to these types of memory and may be implemented using a wide variety of memory types.

In some configurations, the cache 161 may be configured as a secondary cache, being faster and smaller than the main storage 165. The cache 163 is a primary cache, being faster and smaller than the secondary cache 161. Generally, the terms "primary" and "secondary" or "first" and "second" refer generally to hierarchy of time and/or priority relative to commands received via the host interface 171. For example, current read/write requests from the host 159 may be processed first via the primary cache 163 (e.g., identified by the data's logical block address). This enables host commands to complete quickly should the requested data be stored in the primary cache 163. If there is a miss in the primary cache 163, the requested data may be searched for in the secondary cache 161. If not found in either, requested data may be processed via the main storage 165.

Some of the data stored in the primary cache 163 may either be copied or moved to the secondary cache 161 as new requests come in. The copying/movement from primary cache 163 to secondary cache 161 may also occur in response to other events, e.g., a background scan. Both copying and moving involve placing a copy of data associated with an LBA range in the secondary cache, and moving may further involve freeing up some the LBA range in the primary cache for other uses, e.g., storing newly cached data.

Figure 1B:
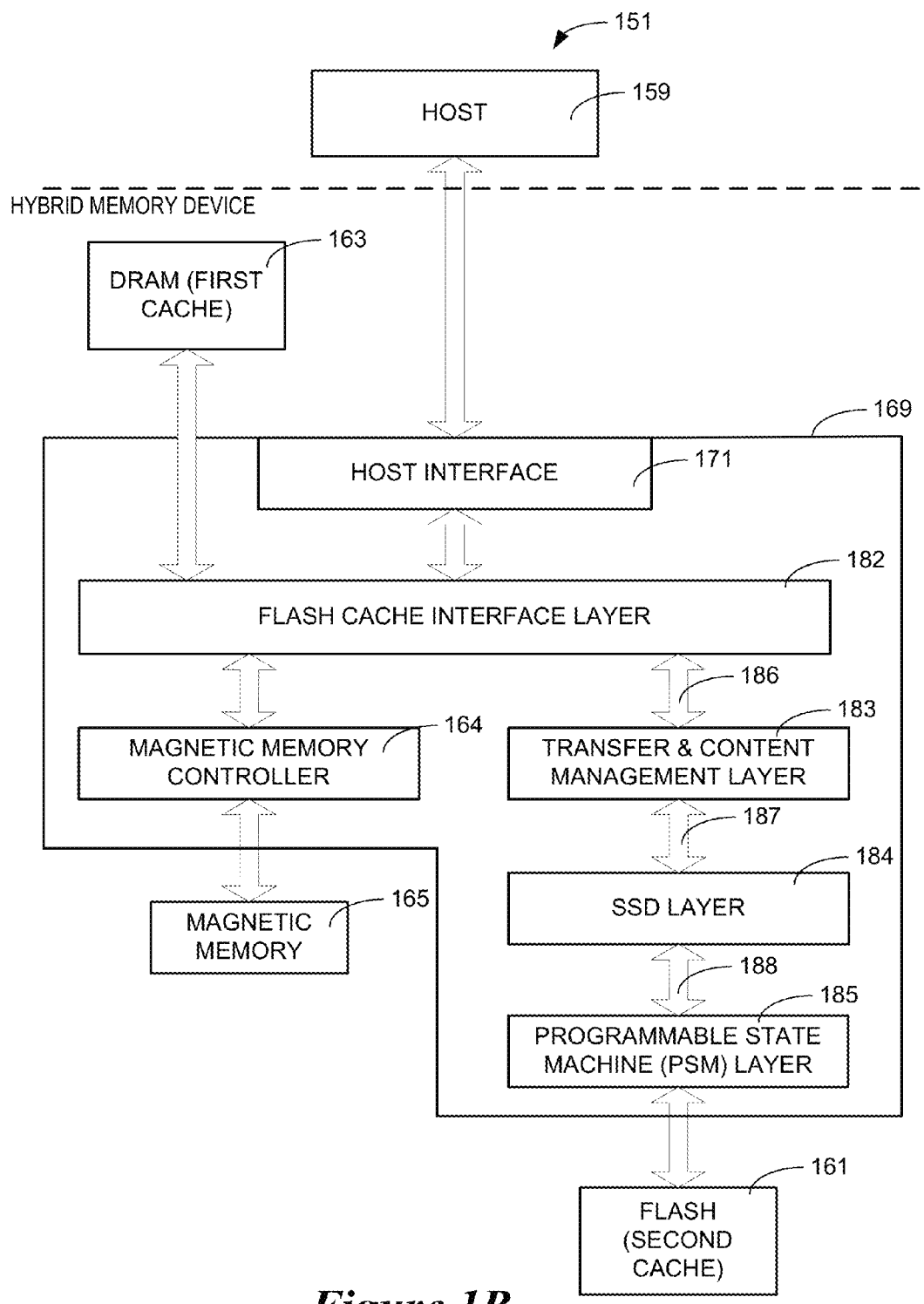
FIG. 1B is a block diagram of a hybrid memory system that includes a magnetic disk as a primary memory and a flash memory as a secondary memory, the hybrid memory system configured to manage memory access requests in accordance with some embodiments.

FIG. 1B illustrates a more detailed version of a system 151 that includes a host processor 159 coupled to a hybrid memory device. The hybrid memory device includes a magnetic memory 165 which serves as the main memory, dynamic random access memory (DRAM) 163 arranged as a first cache, and flash memory 161 arranged as a second cache. In this configuration, the flash cache 161 acts as a second cache, being faster but smaller than the main memory 165. The DRAM 163 serves as the first cache, being faster but smaller than the flash cache 161. While there is some processing and data transfer overhead in using the one or more caches 163, 161, the faster media used by the cache may enhance overall performance of the apparatus hybrid memory device.

The host processor 159 communicates with the hybrid memory device (also referred to herein as hybrid drive) through a host interface 171. As previously discussed, the main memory 165 includes a memory space that corresponds to a number of memory sectors, each sector addressable using a unique a logical block address (LBA). The sectors of the main memory 165 are directly accessible by the host 159 using the LBAs, and thus the corresponding LBAs of the main memory 165 are referred to herein as host LBAs.

The host 159 sends memory access requests to the hybrid drive, for example, the host 159 may request that data be written to and/or read from the hybrid memory device. The host interface 171 is configured to transfer memory access requests from the host 159 to the hybrid memory device and to transfer data between the host 159 and the hybrid memory device.

The hybrid controller 169 illustrated in FIG. 1B includes number of layers 182, 183, 184, 185 wherein each layer communicates to its nearest neighboring layer(s), e.g., through a set of requests. For example, each layer 182, 183, 184, 185 may only communicate to its nearest neighboring layer(s) without communicating to other layers. As an example, the layer 183 may only communicate directly to layer 184 and layer 182, without communicating directly with the layer 185 or to the host interface 171. As an operation, such as a memory access request from the host 159, is being carried out, each layer is configured to pass control to the next lower layer as the operation is implemented.

The example illustrated in FIG. 1B includes four layers 182-185 which are described in terms applicable to the use of flash memory as a cache. It will be appreciated that these terms are not restrictive, and if other types of memory were used as the secondary memory, if desired, different terminology could be used to reflect the type of secondary memory. Nevertheless, the basic functions of the layers can be similar, regardless of the type of memory used for primary and/or secondary memory, and/or the terminology used to describe the layers.

The layers illustrated in FIG. 1B include: the flash cache interface (FCI) layer 182; the flash cache control and transfer management (FCTM) layer 183; the solid state drive (SSD) layer 184; and the programmable state machine (PSM) layer 185. Requests may be passed as indicated by arrows 186, 187, 188 from a higher layer to the next lower layer starting with the FCI layer 182 and proceeding to the PSM layer 185 which interacts directly with the flash memory 161. The layered architecture of the hybrid controller 169 described herein allows for handling host memory access requests which can be serviced from either the magnetic memory 165 or one of the caches 163, 161. The layered structure used in conjunction with the flash cache 161 can be configured to achieve specified rates and response times for servicing memory access requests.

The FCI layer 182 decides whether a host read request should be serviced from the primary memory or from one of the caches 163, 161. The FCI layer 182 implements processes to determine which data should be promoted to the flash secondary cache 161 and/or the primary cache 163 based on various criteria to achieve optimal workload for the hybrid memory device. The flash content and transfer management (FCTM) layer 183 maintains a mapping, e.g., a fully associative mapping as discussed below, of the host LBAs to a memory space corresponding to the flash memory space arranged as LBAs which are referred to as solid state drive (SSD) LBAs. The SSD layer 184 interacts with programmable state machine (PSM) layer 185 and performs tasks such as optimal scheduling of promotion requests among dies of the flash (referred to as die scheduling), wear leveling, garbage collection and so forth. The SSD layer 184 maps the SSD LBAs of the FCTM layer 183 to physical flash locations (die, block and page locations). The PSM layer programs hardware controllers to generate the required signals to read from and write to the flash 161, for example.

In some cases, one or more of the layers 182-185 of the hybrid controller 169 may be implemented by circuitry and/or by one or more processors, e.g., such as reduced instruction set computer (RISC) processors available from ARM. In some cases each layer may be implemented by a separate processor. The processes discussed herein are implementable in hardware (interconnected electronic components that carry out logic operations) and/or by a processor implementing software instructions, and/or by any combination of hardware and software.

Figure 2:
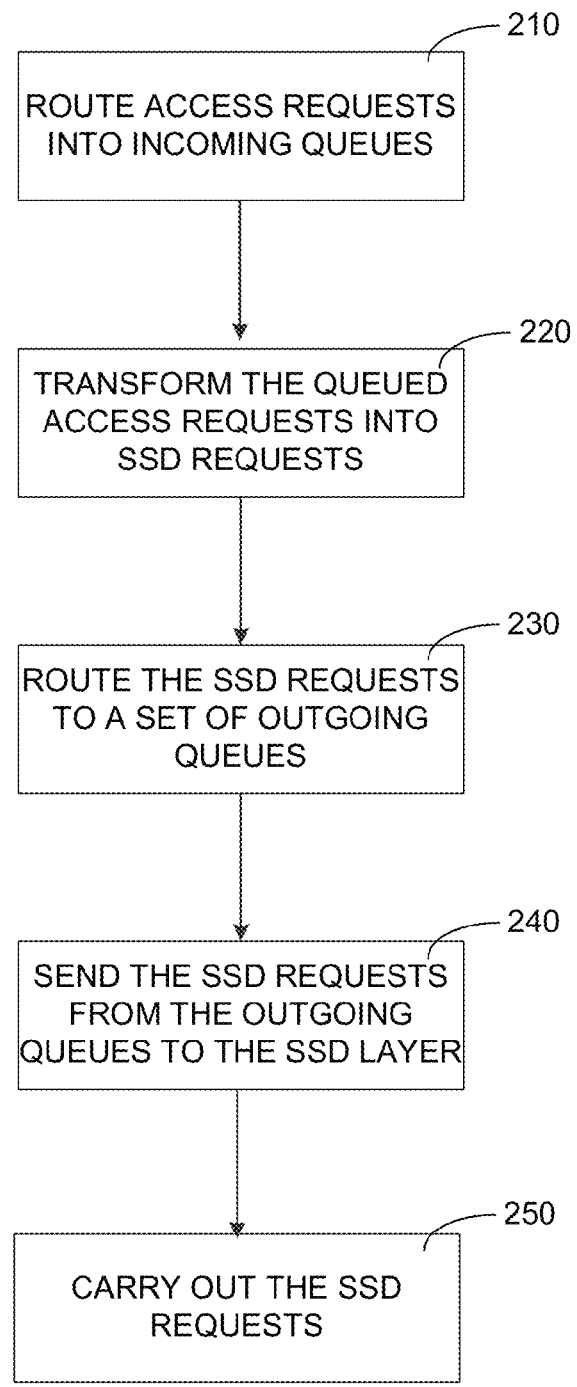
FIG. 2 is flow diagram illustrating a process of managing memory access requests in accordance with some embodiments.

Embodiments described herein involve processes implemented by the FCTM layer to manage memory access requests received from the FCI layer and sent to the SSD layer. The memory access requests may involve reading the flash memory, writing to the flash memory, and so forth. In various embodiments, management and implementation of the memory access requests is accomplished in the FCTM layer using a set of incoming queues and a set of outgoing queues. FIG. 2 is a flow diagram that illustrates a process of managing memory access requests in the FCTM layer. Memory access requests are received by the FCTM layer from the FCI layer and SSD memory access requests are sent to the SSD layer by the FCTM layer. Memory access requests (sometimes referred to herein as incoming memory access requests, or as incoming requests because these requests are incoming from the perspective of the FCTM layer) are received by the FCTM layer from the FCI layer. The incoming requests are routed 210 into a set of incoming queues. The memory access requests queued in the incoming queues are transformed 220 into SSD requests (sometimes referred to herein as outgoing memory access requests, or outgoing requests because these requests are outgoing from the perspective of the FCTM layer). The outgoing requests are routed 230 to a set of outgoing queues. The outgoing requests in the outgoing queues are sent 240 to the SSD layer which carries out 250 the SSD requests to perform the operations specified in the SSD requests.

Figure 3A:
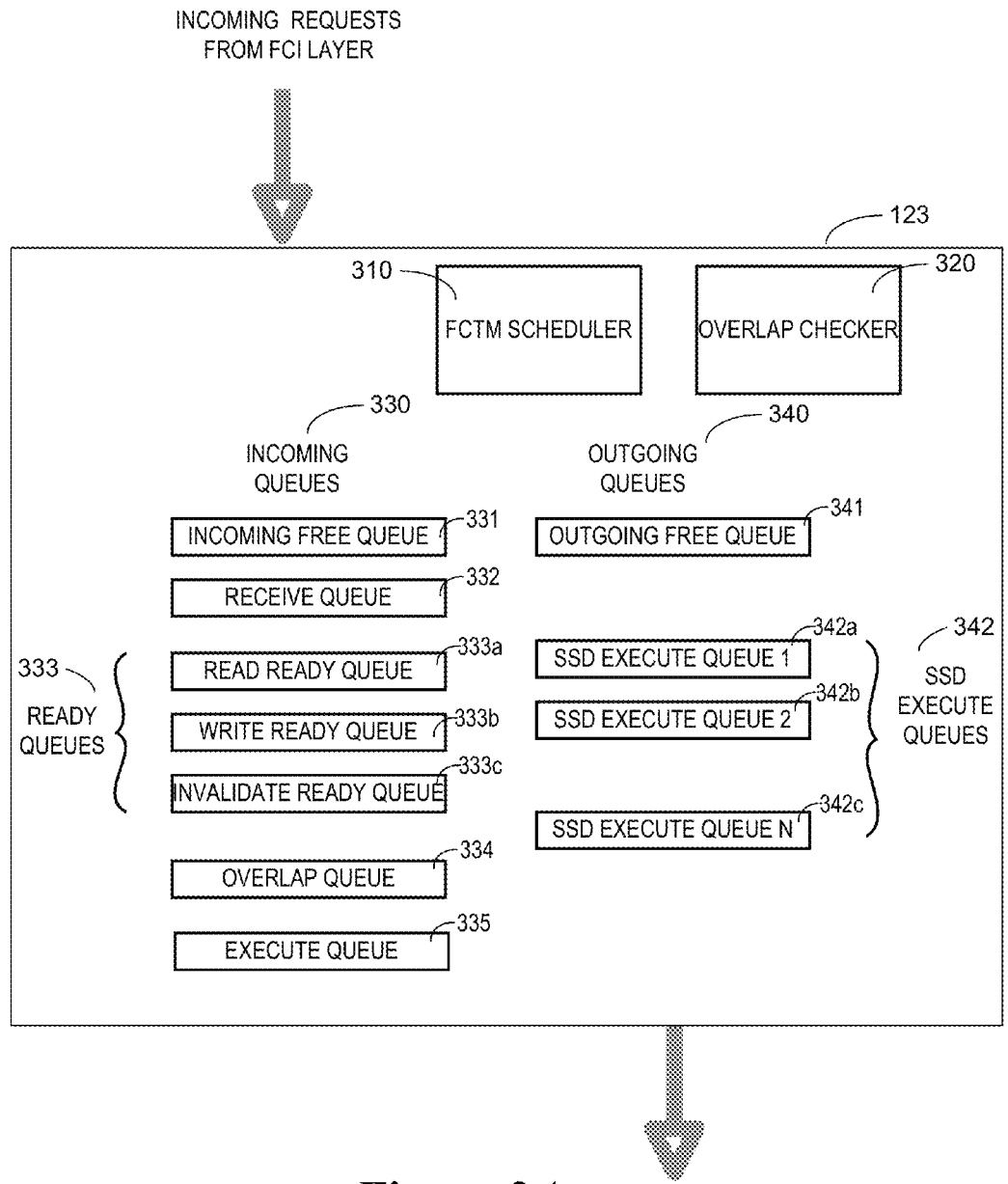
FIG. 3A illustrates the organization of various components of the a hybrid controller in accordance with some embodiments.
Figure 3B:
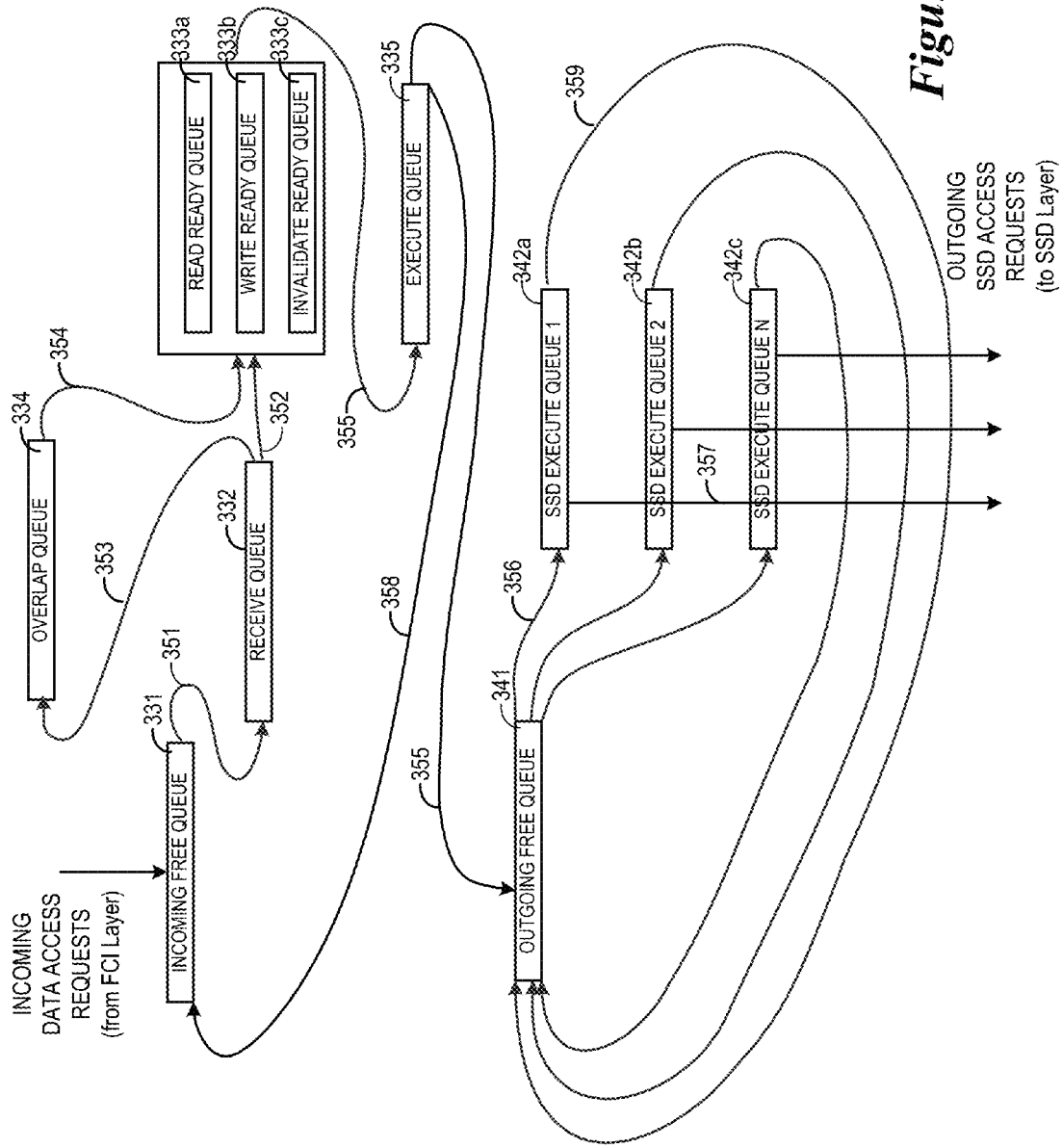
FIG. 3B diagrammatically illustrates the flow of memory access requests in various queues of the hybrid controller in accordance with various embodiments.

FIG. 3A illustrates the organization of various components of the FCTM layer 183, and FIG. 3B diagrammatically illustrates the flow of memory access requests/SSD requests among the queues. As depicted in FIG. 3A, the FCTM layer 183 includes a FCTM scheduler 310 which is responsible for various operations of the FCTM layer 183 such as routing incoming memory access requests and/or outgoing requests among the various queues 330-342 of the FCTM layer 183. The FCTM layer 183 also includes an overlap checker 320 configured to determine if there is an overlap between the memory access requests. An overlap may occur if there is an overlap in the host LBA ranges of two memory access requests.

The overall structure of the incoming queues 330 and the outgoing queues 340 is illustrated in FIG. 3A. The incoming queues 330 include an incoming free queue 331 of nodes which are used to control the flow of memory access requests into the receive queue 332. Generally, the FCTM scheduler 310 routes incoming memory access requests from the FCI layer into the receive queue 332 only if a node is available in the incoming free queue 331. In other words, the number of nodes in the incoming free queue 331 represent the capacity of the FCTM layer 183 at any particular time to process incoming memory access requests.

As illustrated in FIG. 3B, if a node is available in the incoming free queue 331, that node becomes "occupied" by an incoming memory access request when the memory access request is routed 351 into the receive queue 332. When a node is occupied by a memory access request, information about the memory access request is stored in the node. For example, the node may store information about the type of memory access request, the host LBAs involved in the memory access request, information about the progress of the memory access request, such as how much data has been transferred in conjunction with the memory access request, how much work to complete the memory access request is pending and so forth. If a node is not available in the incoming free queue 331, then the FCTM layer does not have the capacity to process the incoming memory access request and an error message is generated.

The FCTM layer can process a number of types of memory access requests received from the FCI layer. FIGS. 3A and 3B, illustrate the process for three types of memory access requests—read requests, promotion requests, and invalidate requests. As explained in more detail herein, read requests are requests from the FCI layer to read host LBAs from the flash, promotion requests are requests to promote (write) host LBAs into the flash, and invalidate requests are requests to mark certain host LBAs in the flash as invalid (not containing valid data). In the illustrated example of FIGS. 3A and 3B, the FCTM layer 183 includes a separate ready queue 333a, 333b, 333c for each type of request. However, in some implementations, at least some of the queues may be shared queues between different types of requests. Memory access requests are moved 352 to the appropriate ready queue 333a, 333b, 333c when they do not have any overlaps with other requests in the execute or ready queues and they are waiting to be routed to the execute queue to begin execution. A memory access request remains in the ready queue until there is at least one SSD resource available to execute the request. In in illustrated example, SSD nodes that are available in the outgoing free queue represent SSD resources, thus if there is at least one available SSD node, the memory access request can be moved to the execute queue. The incoming memory access requests are transformed into a number of outgoing SSD requests which transferred to the SSD execute queues 342a-b as outgoing nodes in the outgoing free become available.

Each read request, promotion request, and invalidate request has associated with it a particular address range (host LBA range). The FCTM layer 183 may transform one incoming memory access request (e.g., read request, promotion request, invalidate request) from the FCI layer into one or multiple SSD requests which the FCTM layer 183 issues to the SSD layer. Requests issued by the FCI layer 182 and received by the FCTM layer 183 are referred to herein as memory access requests or incoming FCI requests, or incoming memory access requests. Requests issued by the FCTM layer 183 to the SSD layer 184 are referred to herein as SSD requests, outgoing SSD requests, or as outgoing memory access requests. The FCTM layer transforms each incoming memory access request that has an associated host LBA range into one or multiple outgoing memory access requests that each have an associated SSD LBA range or cluster of SSD LBAs. For example, the FCTM layer 183 implements an incoming a read request by generating one or more SSD requests that include an SSD LBA range. The FCTM layer 183 implements an incoming promotion request by generating one or more outgoing SSD requests that include a cluster of SSD LBAs; the FCTM layer 183 implements an incoming invalidate request by generating one or more outgoing SSD requests that include a cluster of SSD LBAs.

As previously discussed, the FCTM layer 183 includes an overlap checker 320 which operates in conjunction with an overlap queue 334. As best illustrated in FIG. 3B, requests in the receive queue 332 may be routed 353 into the overlap queue 334 when an overlap in memory access requests is identified by the overlap checker 320. An overlap may occur if there is an overlap in the address range (e.g., host LBA range) of two memory access requests. For example, an overlap can occur if a read request and a promotion request have overlapping address ranges. In this example, assuming the promotion request is received in the FCTM layer before the read request, the promotion request may be completed before the read request is moved to the read ready queue to avoid overlap conflicts. During the time that the promotion request is in the promotion ready queue 333*b* or the execute queue 335, the read request remains in the overlap queue 334. Appropriate management of overlapped memory access requests avoids erroneous data being read from or written to the flash memory 161. After the overlap has been cleared, the memory access request is routed 354 into the appropriate ready queue 333*a-c*.

If the FCTM layer 183 has at least one resource (an SSD node) available, the memory access request is transferred 355 from a ready queue 333*a-c* to the execute queue 335. Execution of a memory access request in the execute queue 335 involves transforming the memory access request in the execute queue 335 into a number of SSD requests that provide instructions to the SSD layer 184 to carry out the memory access request. A memory access request from the FCI layer includes a host LBA range and this host LBA range is transformed to an SSD LBA range by the FCTM layer. In some implementations, the FCTM internally keeps track of the host LBA range in terms of clusters (groups) of n host LBAs (referred to as host LBA clusters) and keeps track of the SSD LBA range in terms clusters of n SSD LBAs. Transformation of contiguous clusters of host LBAs may or may not be transformed into contiguous clusters of SSD LBAs. After the SSD request is transferred to the SSD layer, the SSD layer may convert the SSD LBA range included in the SSD request to flash address (die, block and page). For execution of a memory access request to begin, the outgoing free queue 341 must have available at least one available node, otherwise an error message is generated. Different types of memory access requests may be transformed into different numbers of SSD requests which is associated with the amount of work required by the type memory access request. For example, an invalidate request may occupy a first number of nodes, e.g., only one node, whereas a read or promotion request may occupy a larger number of nodes.

In some cases, when a particular memory access request in the execute queue 335 is transformed into a number of SSD requests, one, e.g., only one, of the SSD execute queues 342*a-c* will include all the SSD requests associated with the incoming memory access request in the execute queue 335. Each of the SSD requests represents outstanding work to the SSD layer. As nodes become available in the outgoing free queue 341 to execute a memory access request in the execute queue 335, those available outgoing nodes become "occupied" 355 by the SSD requests associated with the memory access request which is being executed. The SSD requests associated with the memory access request being executed are transferred 356 to an SSD execute queue 342*a-c*. The memory access request being executed may remain in the execute queue 335 (occupying a node from the incoming free queue) until execution of the memory access request by the FCTM layer is complete. Execution of a memory access request in the FCTM layer may be deemed to be complete when the responsibility for processing the memory access request is transferred from the FCTM layer 183 to the SSD layer 184. This occurs after all the SSD requests associated with a memory access request are issued to the SSD layer. For example, responsibility may be transferred when the last SSD request associated with a memory access request is successfully transferred 357 to the SSD layer or when the last SSD request associated with the memory access request has been successfully completed by the SSD layer and acknowledgement of the successful completion of the SSD request has been received by the FCTM layer.

When execution of a memory access request is complete, the node from the incoming free queue that was previously occupied by the incoming memory access request in the execute queue 335 is returned to the incoming free queue 331. The previously occupied node becomes available again for being occupied by subsequent memory access requests. Each of the nodes in the SSD execute queue associated with the memory access request being executed are returned 359 to the outgoing free queue 341 as the SSD requests occupying these nodes are completed. The previously occupied SSD nodes become available again to be occupied by subsequent SSD requests. In some cases, an error occurs when one or more SSD requests are transferred to the SSD layer. When an error occurs in the processing of SSD requests associated with a memory access request, the node used to process the incoming memory access request may be returned to the incoming free queue, and the SSD nodes used to process the outgoing SSD requests may be returned to the outgoing free queue. In other words, the processing of the incoming memory access request is cancelled and not completed when an error occurs.

In some implementations, incoming memory access requests from the FCI layer to the FCTM layer is restricted meaning that during a time that the FCTM layer is processing a memory access request then the FCI layer is barred from issuing another memory access request to the FCTM layer. Implementations that restrict additional incoming memory access requests from the FCI layer protects the FCTM layer from excessive combinations of possible events affecting the FCTM layer and enhances the thread safety of the layer. In some implementations the code, e.g., all of the code, that manages the queues is executed on a single thread and none of the data structures of the FCTM layer, e.g., the queues can be used are manipulated by external entities, e.g., other layers of the hybrid controller.

A priority scheme may be used for transferring the incoming and/or outgoing memory access requests between queues. In some cases, the priority scheme may be multi-tiered, wherein a first level of priority is implemented by the FCTM scheduler to select incoming memory access requests from the ready queue and a second level of priority is implemented by the FCTM scheduler when assigning SSD nodes from the outgoing free queue.

A priority scheme, e.g., first level priority, may be used to select requests from the ready queues for transfer to the execute queue. According to one priority scheme, requests that require the least resources and/or are faster to execute may be selected for execution before requests that require more resources and/or are slower to execute. For example, invalidate requests present in the invalidate ready queue may be selected for execution before read or promotion requests in the read ready queue or promotion ready queue, respectively, because invalidate requests are the faster to execute. In general, invalidate requests execute faster than either read or promotion requests and read requests execute faster than promotion requests, thus the priority scheme may follow this order. For example, the invalidate requests may not require input/output (I/O) transferred via the PSM layer to the flash and may be executed by updating metadata in the FCTM layer and performing an unmap in the SSD layer, which also only involves the updating of metadata in the SSD layer. Requests that do not require I/O to the flash typically take the least amount of time to execute. Despite not requiring I/O to the flash, the FCTM scheduler may use an SSD node to keep track of and regulate the flow of invalidate requests.

Figure 4:
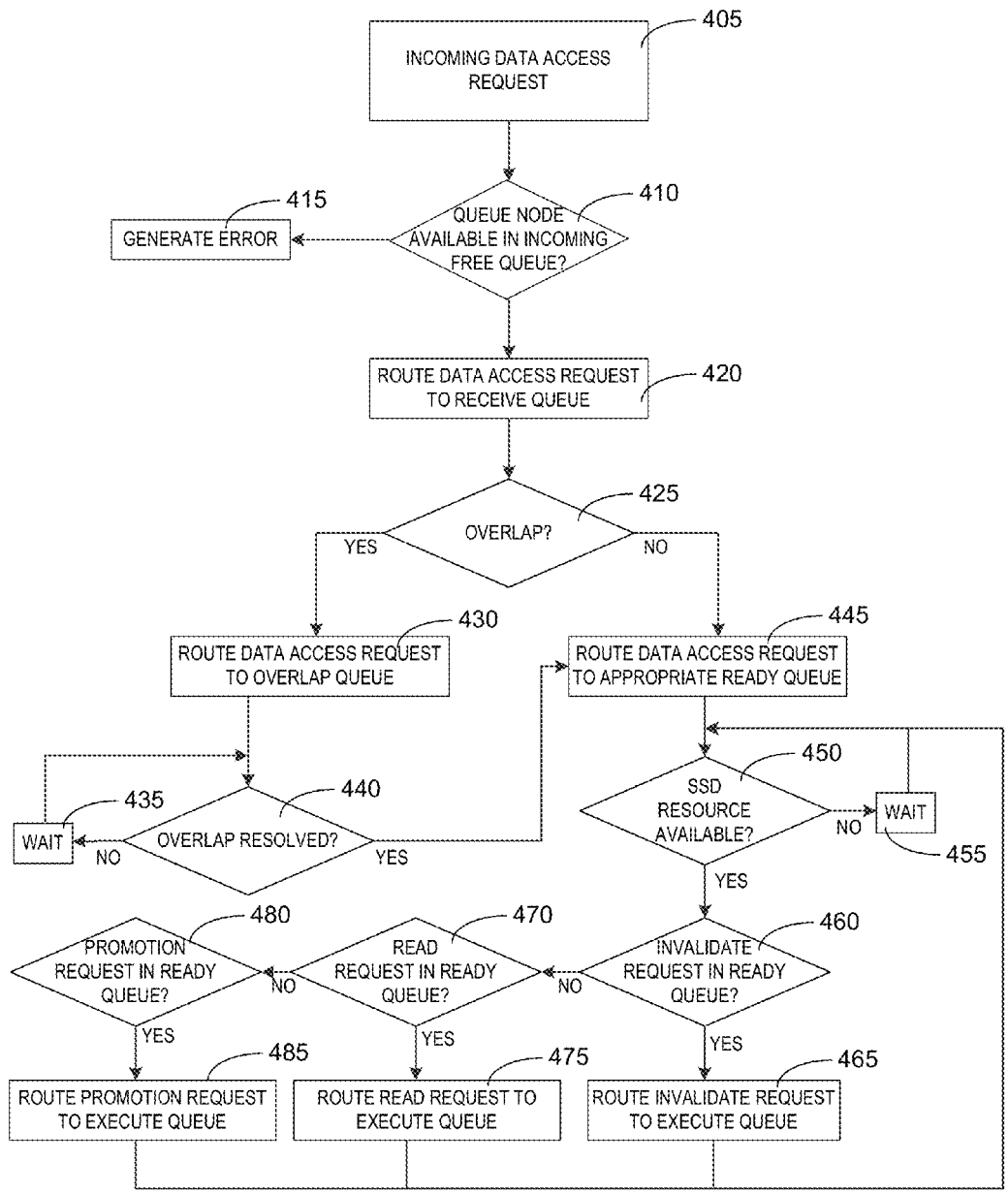
FIG. 4 is a flow diagram that illustrates a priority scheme that may be implemented to route memory access requests according to some embodiments.

The flow diagram of FIG. 4 conceptually illustrates an overview of one priority scheme that may be implemented by the FCTM scheduler for routing memory access requests from the ready queues to the execute queue. As previously discussed, for each incoming memory access request 405, the FCTM scheduler routes the memory access request to the receive queue 420 if there is a node available in the incoming free queue 410. If there are no nodes available 410 in the incoming free queue, the FCTM scheduler generates an error response which is sent to the FCI layer.

The FCTM overlap checker determines 425 if the address range (host LBA range) of the memory access request that is routed to the receive queue overlaps with the address range of other memory access requests. If an overlap is not detected 425, the memory access request is routed 445 to the appropriate ready queue. If an overlap is detected 425, the memory access request is routed 430 to the overlap queue. Data access requests routed to the overlap queue wait there until the overlap is resolved. If the overlap is resolved 440, the previously overlapped memory access request is routed 445 to the appropriate ready queue.

Data access requests wait 455 in the ready queue until at least one SSD node in the outgoing free queue is available 450 for execution of the memory access request. Once an SSD node is available 450, the priority scheme for routing memory access requests to the execute queue is implemented. If there is 460 an invalidate request in the ready queue the invalidate request is routed to the execute queue 465 and the process returns to the implementation of the priority scheme at step 450. According to the priority scheme, if multiple invalidate requests are present in the invalidate ready queue, these invalidate requests would be processed until the invalidate ready queue is empty. If the invalidate ready queue is empty and there is 470 a read request in the read ready queue, the read request is routed 475 to the execute queue and the process returns to the implementation of the priority scheme at step 450. If there are 460, 470 no invalidate requests or read requests in their respective ready queues and there is 480 a promotion request in the promotion ready queue, the promotion request is routed 485 to the execute queue and the process returns to the implementation of the priority scheme at step 450.

In some scenarios, a priority scheme may be pre-emptive—involving pre-empting requests in the execute queue with requests in the ready queue. In some implementations such a pre-emption takes place if the request in the ready queue would take less time/resources for execution than the request in the execute queue. In one example, invalidate requests in the ready queue preempt promotion requests in the execute queue. Execution of the invalidate requests may cause a delay in the completion of the execution of the promotion request, however, this delay may be minimal because the invalidate requests can be executed very quickly if there is no I/O to the flash.

Figure 5A:
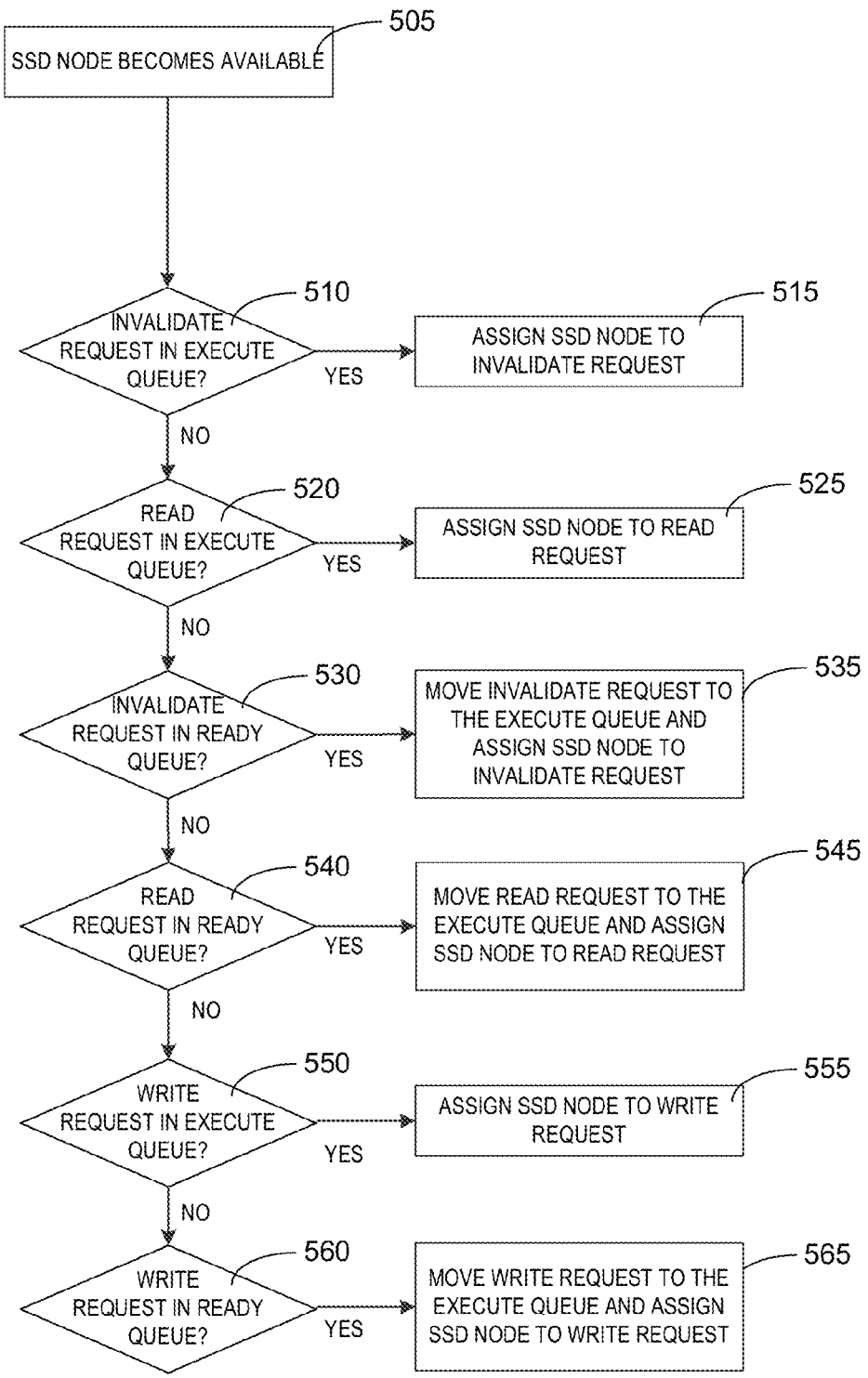
FIGS. 5A and 5B are flow diagrams that illustrate various priority schemes for managing memory access requests in accordance with various embodiments.

One possible implementation of a pre-emptive priority scheme is conceptually illustrated by the flow diagram of FIG. 5A. Such a priority scheme may be implemented alone or as a second level of priority in conjunction with another priority scheme, e.g., the priority scheme discussed in connection with FIG. 4. After the work associated with an SSD request occupying an SSD node is completed, the SSD node is returned to the outgoing free queue and becomes available 505 again. A priority scheme is implemented that determines the memory access request to which this available SSD node is next assigned. According to the priority scheme of FIG. 5A, if 510 there is an invalidate request in the execute queue, the SSD node is assigned 515 to the invalidate request. If 520 there is a read request in the execute queue, the SSD node is assigned 525 to the read request. If 530 there is an invalidate request in the ready queue, the invalidate request is moved to the execute queue and the SSD node is assigned 535 to the invalidate request. If 540 there is a read request in the ready queue, the read request is moved to the execute queue and the SSD node is assigned 545 to the read request. If 550 there is a promotion request in the execute queue, the SSD node is assigned 555 to the promotion request. If 560 there is a promotion request in the ready queue, the promotion request is moved to the execute queue and the SSD node is assigned 535 to the promotion request. The priority scheme illustrated in FIG. 5 provides for an optimal ordering in the execution of requests to achieve minimal host request latency.

Note that the priority scheme illustrated in FIG. 5A may mean that a request in the execute queue may be pre-empted by a request for which execution has not yet started. The preempting request may be in the ready queue and, if so, the pre-empting request would be moved to the execute queue and the available SSD node would be assigned to it. Thus, the pre-empting request may delay the execution of a request in the execute queue that is currently being executed.

Figure 5B:
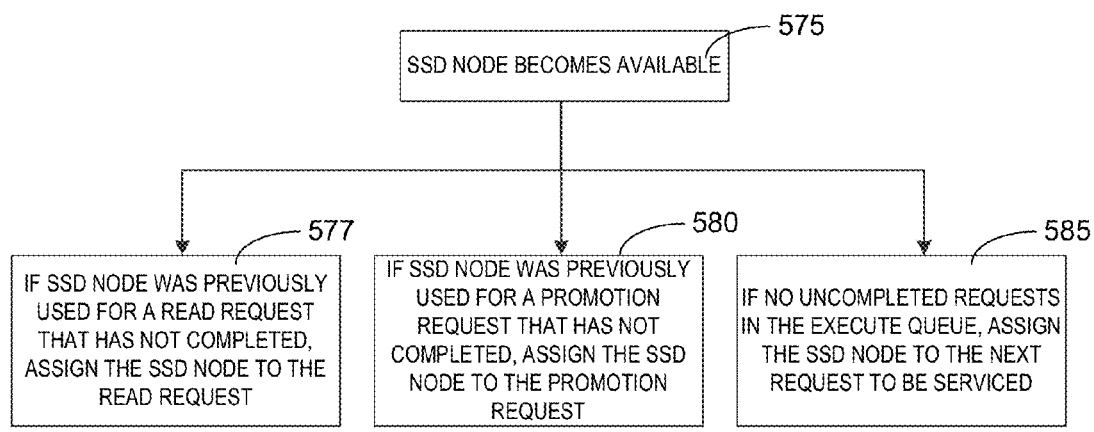

FIG. 5B illustrates another priority scheme that may be used to select requests for assigning available SSD nodes. The priority scheme illustrated in FIG. 5B may be used as a second level priority scheme in conjunction with the priority scheme of FIG. 4. As previously discussed, the SSD nodes are used for SSD requests that implement an incoming memory access request. More than one SSD request may be needed for a single memory access request in the execute queue. If an SSD request occupying an SSD node completes, the node becomes available 575 to service another SSD request. According to the priority scheme of FIG. 5B, the SSD nodes that become available and have been used to service SSD requests for a particular memory access request in the incoming execute queue would be used to service the next SSD requests for the same memory access request in the execute queue until that memory access request is complete. For example, if the SSD node that has become available was previously used by an SSD request generated in conjunction with a read request in the incoming execute queue that has not yet completed, then the SSD node is assigned 577 to the next SSD request that services the read request in the execute queue. If the SSD node that has become available was previously used by an SSD request generated in conjunction with a promotion request in the execute queue that has not yet completed, then the SSD node is assigned 580 to the next SSD request that services the promotion request in the execute queue. If the SSD node was used in conjunction with a memory access request that has completed, the SSD node is assigned to an SSD request associated with the next memory access request to be serviced.

Figure 6:
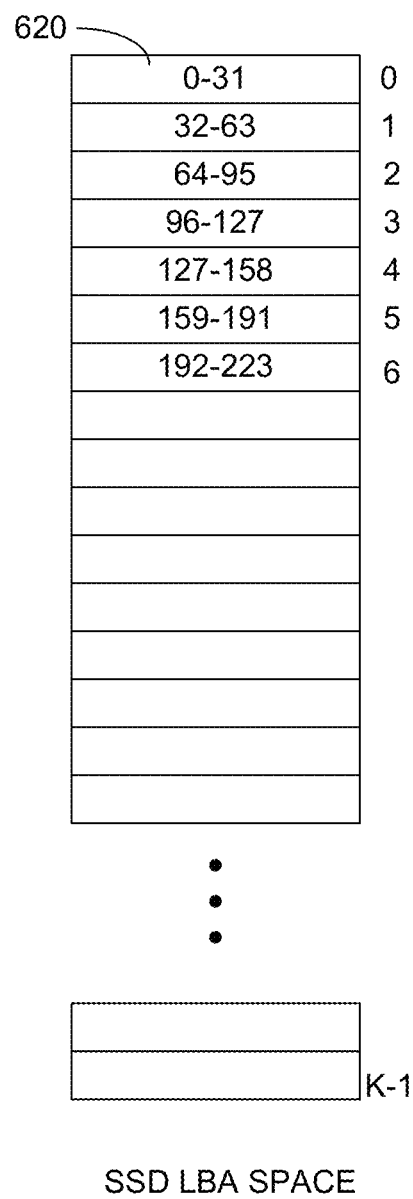
FIG. 6 illustrates the secondary memory space arranged as clusters of LBAs in accordance with some embodiments.

FIG. 6 conceptually illustrates the SSD LBA memory space 620. As shown in FIG. 6, the SSD LBA space 620 is partitioned into K clusters, each cluster comprising n sectors or LBAs (each sector is identified by a logical block address (LBA)), each sector comprising l bits of data. In the illustrated example of FIG. 6, n=32, although, in general, the number of clusters, K, and the number of sectors per cluster, n, may be any nonzero number.

Figure 7:
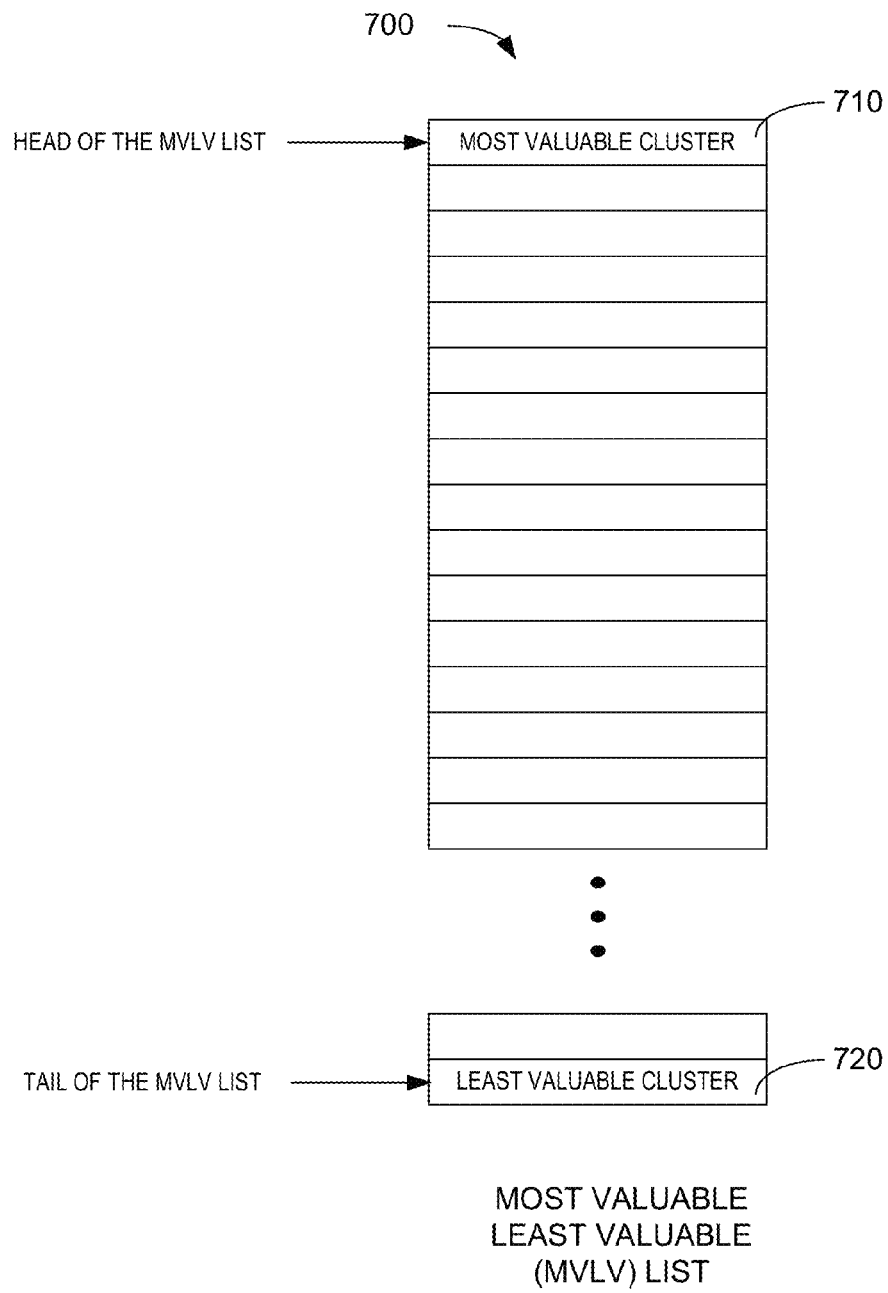
FIG. 7 illustrates a most valuable least valuable list that may be maintained by the hybrid controller of some embodiments.

In some scenarios, the flash memory may be full when a promotion request is executed. If so, the FCTM may cause some data stored in flash to be evicted. To implement evictions, as illustrated in FIG. 7, the FCTM layer maintains a most valuable least valuable (MVLV) list of clusters 700 which ranks the value of the clusters according to some criteria, which may be based on one or a number of factors such as which of the clusters was most/least recently used and/or which of the clusters is most frequently/least frequently used, for example. One end of the MVLV list 710 is referred to herein as the head, which is the position of the currently most valuable cluster, and the opposite end 720 of the MVLV is referred to as the tail, which is the position of the currently least valuable cluster. If the flash memory is full and a promotion request is executed, the cluster at the tail 720 of the MVLV list is selected for eviction. In some implementations, when a cluster is read or written, that cluster becomes the most valuable cluster, because it was most recently used, and is moved to the head of the MVLV list 710.

The FCTM layer maintains list, e.g., linked list, of free SSD LBA clusters (denoted the free list) and/or maintains a list, e.g., linked list, of in-use SSD clusters (denoted the use list). The free list includes SSD clusters that are available for use. The use list includes SSD clusters that contain valid data and are not available to accept new data. In some cases one or more SSD clusters may be in a detached state during which the SSD clusters are not in either the use state or the free state. An SSD cluster may be in a detached state, for example, during the time that the clusters are involved in execution of a request, e.g., during the time that data is written to the clusters.

Figure 8:
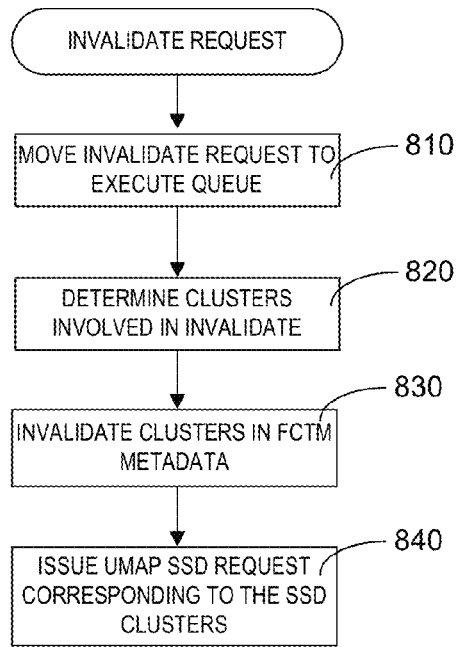
FIGS. 8, 9, and 10 are flow diagrams that illustrate implementation of invalidate, read, and promotion requests, respectively.
Figure 9:
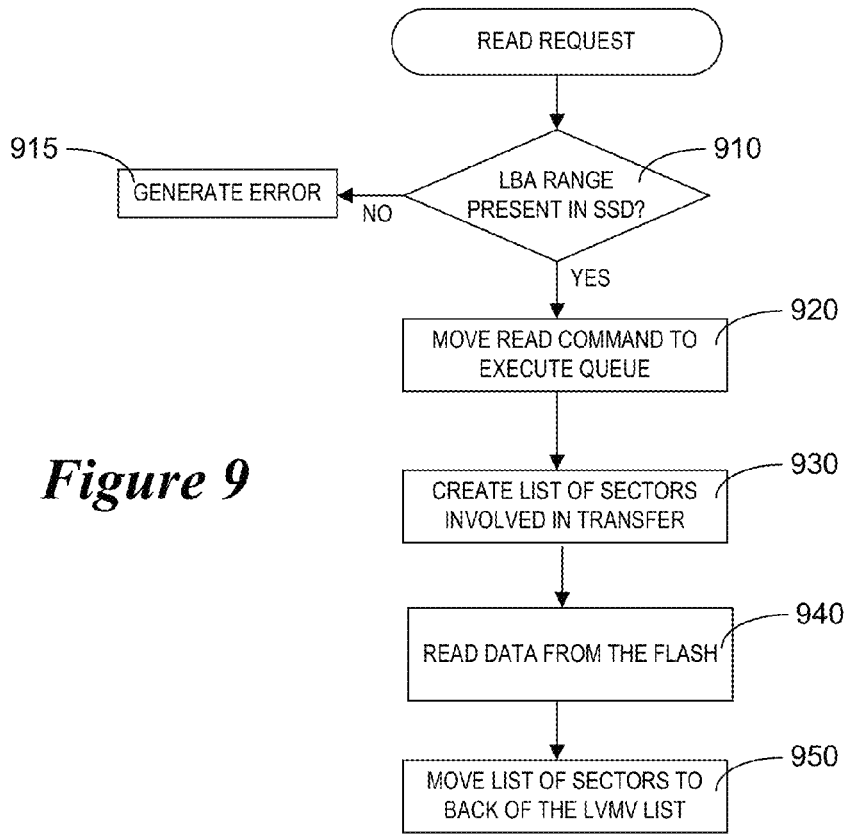
Figure 10:
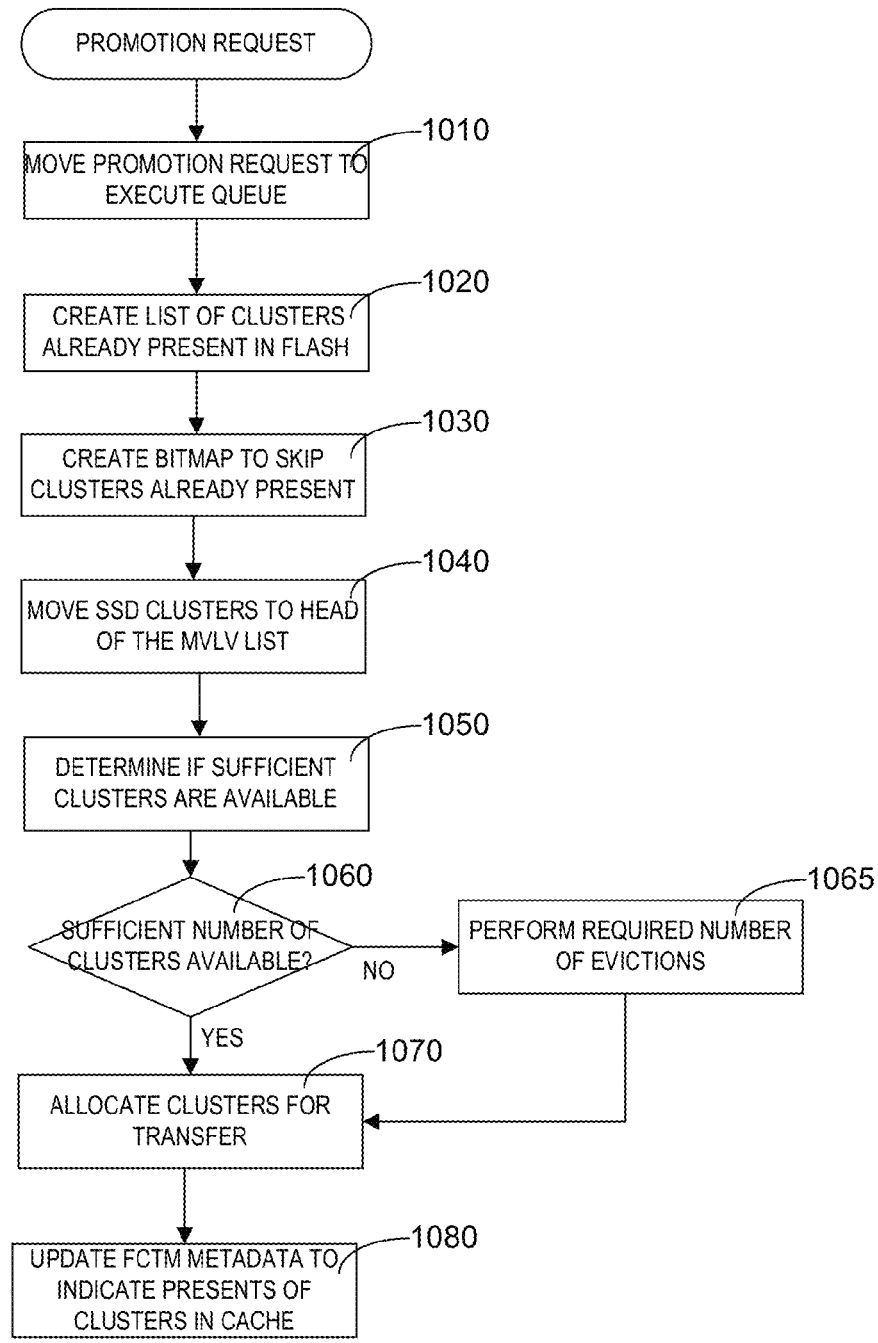

The flow diagrams of FIGS. 8, 9, and 10 conceptually illustrate some steps involved in the execution of invalidate, read, and promotion requests, respectively, performed by the FCTM layer. As previously discussed, each incoming memory access request includes a command portion and a host LBA range. The command portion identifies the type of request and the host LBA range indicates the host LBAs involved in the request. In addition, a promotion request is associated with the data to be written to the LBA range specified in the promotion request.

An invalidate request issued by the FCI layer identifies a cluster aligned range of host LBAs to be invalidated. A cluster aligned LBA range means that the start of the LBA range and the end of the LBA range are not arbitrary, but are multiples of n, which is the number of sectors per cluster. The invalidate request is transferred 810 to the execute queue. The FCTM layer maps the cluster aligned LBA range of the incoming memory access request to the SSD LBA clusters and determines 820 the SSD LBA clusters involved in the invalidate request. The SSD clusters are invalidated 830 (marked as containing invalid data) in the FCTM metadata. An SSD request sent by the FCTM layer to the SSD layer comprises 840 an unmap request for the corresponding flash memory clusters. The invalidated SSD LBA clusters can be moved to the free cluster list maintained by the FCTM layer in its metadata. Note that implementation of an invalidate request does not require any work performed by the flash A read request involves reading data corresponding to an arbitrary range of LBAs from the flash memory. The host LBA range of a read request from the FCI is not necessarily cluster aligned. There may be an upper bound on the number of LBAs that can be included in the read request. In the example illustrated in FIG. 9, the FCTM layer initially performs a check to determine if 910 the range of host LBAs specified by the read request is fully present in the flash. If the range of host LBAs is not fully present, the read request is rejected and an error response to the FCI layer is generated 915. The error response notifies the FCI layer to obtain the data requested from the primary memory, e.g., the magnetic disk. If the range of LBAs specified by the read request is fully present in the flash memory, then the read request is moved 920 to the execute queue. The FCTM maps the host LBA range to the SSD LBAs. A list of SSD LBAs in the read request is created 930 and the FCTM layer issues one more SSD requests to the SSD layer that specify the SSD LBAs to be read. The list of SSD LBA clusters that include the SSD LBAs of the read request may be made most valuable, e.g. moved 950 to the head of the MVLV list.

A promotion request involves writing a cluster aligned range of host LBAs to the flash memory. There may be an upper bound imposed on the number of LBAs that can be included in one promotion request. The promotion request is moved to the execute queue 1010. A list of the SSD LBA clusters corresponding to the cluster aligned host LBA range specified in the promotion request that are already present in the flash is created 1020. The clusters already present in the flash are denoted overlapped clusters. A bitmap is created 1030 to skip over the SSD LBA clusters that are already present in the flash. The process of determining the clusters already present in the flash and creating the bitmap mask facilitates conservative use of the flash memory space by maintaining a single copy of any host LBA in the flash. The overlapped SSD LBA clusters and the non-overlapped SSD LBA clusters are made most valuable by moving 1040 these clusters to the head of the MVLV list. The FCTM determines 1050 if there are a sufficient number of clusters available to store the clusters to be written into the flash. The clusters to be written to the flash are the clusters implicated by the promotion request that are not already present in the flash. If there are 1060 a sufficient number of clusters available, then clusters for storing the data are allocated 1070 and the SSD LBA clusters to be stored are transferred via the SSD layer to the flash. The metadata of the FCTM layer, i.e., the use list, is updated 1080 to indicate that these clusters are in use. If a sufficient number of clusters is not available 1060 (the SSD LBA space is saturated), then the FCTM layer will perform evictions 1065 to free up a sufficient number of clusters.

Eviction overlap may lead to data errors. Eviction overlap can occur when the address range being evicted overlaps with the address range of an outstanding command that is in the ready queue or the execute queue. The FCTM scheduler described in various embodiments discussed herein is arranged to operate so that eviction overlap is avoided.

If the flash memory is not saturated, i.e., there is a sufficient free space in the flash for promotion without evictions being performed, non-overlapping requests from the FCI layer can execute in any order. For an unsaturated flash, only overlapped requests are placed in the overlap queue. If the flash is saturated, evictions must take place in order to make room for promotion requests to be implemented.

Figure 11:
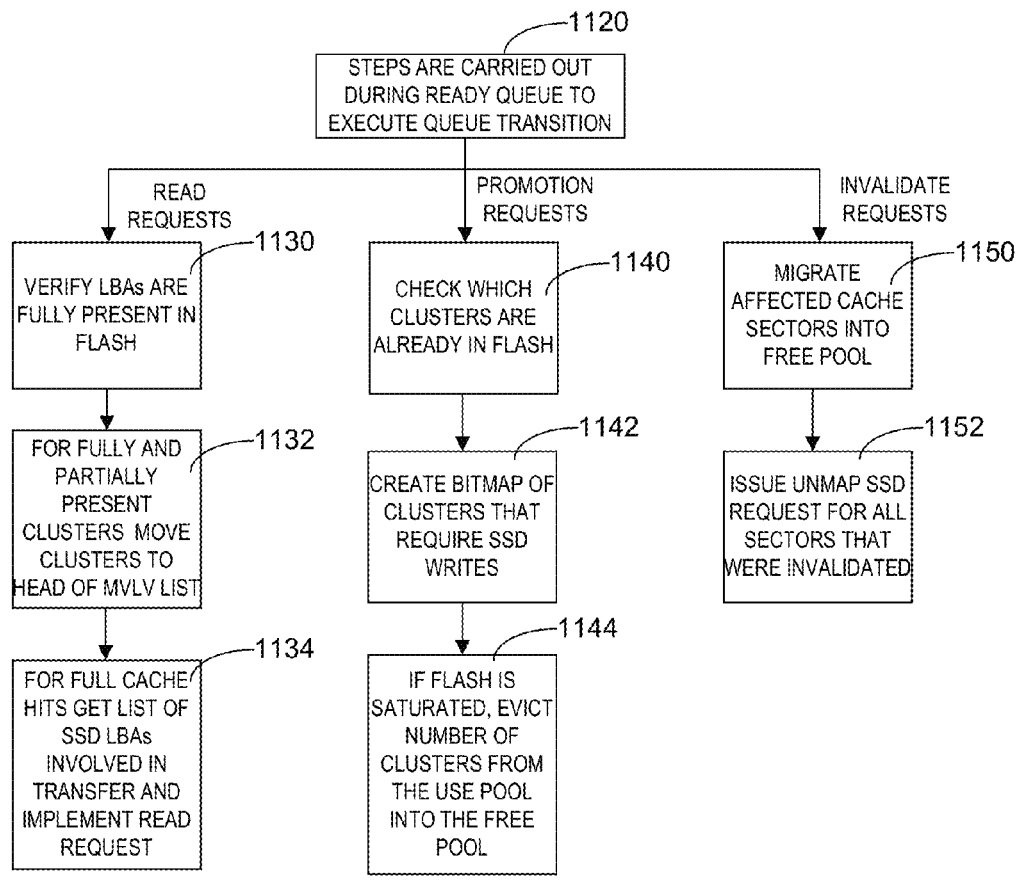
FIG. 11 illustrates processes that are carried out for various memory access requests during the ready queue to execute queue transition according to various embodiments.

As illustrated in FIG. 11, certain steps 1120 are carried out during the ready queue to execute transition for read, promotion, and invalidate requests. These steps may be implemented as atomic operations that are completed without interruption. Performing these steps atomically (without interruption) ensures that no other requests remove these SSD LBA clusters from the SSD LBA space before the request has executed. For example, if an invalidate request is received while a read request is executing, the invalidate request will move to the overlap queue so that the invalidate request does not interfere with the execution of the read request. If the invalidate request were serviced during execution of the read request, there is a possibility that the invalidate request would invalidate some LBAs involved in the read request.

For read requests, during the ready queue to execute queue transition, the FCTM scheduler verifies if the LBA range in specified in the request is 1130 fully present in the flash. If the range is not fully present, the read request is not executed and an error response is generated. The SSD clusters that correspond to the host LBA range of the read request (whether or not fully present) are made most valuable by moving 1132 these clusters to the head of the MVLV list. If the SSD clusters that correspond to the host LBA range of the read request are fully present in the flash, the FCTM scheduler creates 1134 a list the SSD clusters and implements the read request, as previously discussed in connection with FIG. 9.

For promotion requests, during the ready queue to execute queue transition, the FCTM scheduler checks 1140 to determine which SSD LBA clusters are already present in the flash and creates 1142 a bitmap of the overlapped SSD LBA clusters already present in the flash. The bitmap is used to skip writing the overlapped clusters to the flash. If the flash is saturated, the required number of clusters may be evicted 1144 to make room for the new clusters to be written as part of the promotion request.

For invalidate requests implemented, during the ready queue to execute queue transition, the FCTM scheduler migrates 1150 the SSD LBA clusters being invalidated into the free list of SSD clusters. The FCTM scheduler issues 1152 an unmap SSD request for the invalidated clusters.

Figure 12:
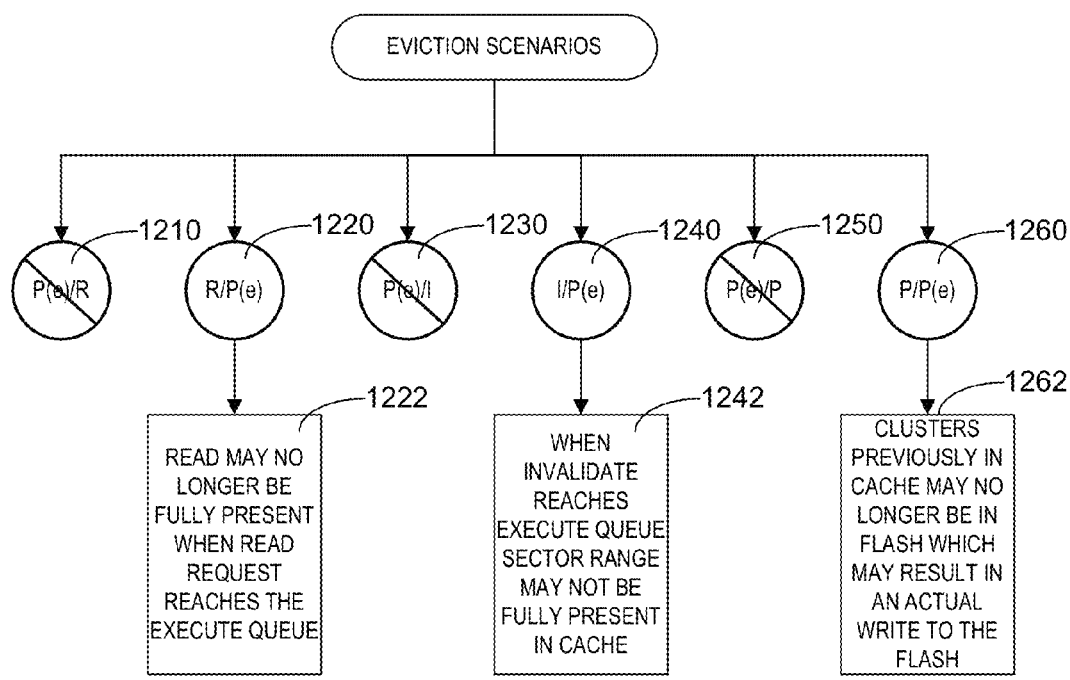
FIG. 12 conceptually illustrates various eviction scenarios according to some embodiments.

Note that evictions can occur in response to promotion requests. To analyze the potential for eviction overlap, the following scenarios are considered as illustrated in FIG. 12.

1. P(e)/R—a read request, R, precedes a promotion request with eviction, P(e) 1210. Eviction overlap in this situation is not possible because during the read requests' transition from the ready queue to the execute queue, the SSD clusters involved in the read request were moved to the head of the MVLV list. The SSD clusters of the read request will not be selected for eviction during the promotion operation with eviction because the clusters evicted prior to the promotion will be selected from the tail of the MVLV list.

2. R/P(e)—a read request follows a promotion request with eviction 1220. The host LBA range of the read request may no longer be fully present in the flash when the read request is executed 1222. If this occurs, the read request will be handled accordingly, e.g., by sending an error message to the FCI layer.

3. P(e)/I—an invalidate request, I, precedes a promotion request with eviction 1230. Eviction overlap in this situation is not possible because invalidate requests are completed synchronously and never remain in the execute queue. The same call chain that places an invalidate request in the execute queue also moves the node occupied by the invalidate request from the execute queue back to the free queue.

4. I/P(e)—an invalidate request follows a promotion request with eviction 1240. When the invalidate request reaches the execute queue, the cluster range may not be 1242 fully present in the flash. In this scenario, only clusters present in the flash will be invalidated.

5. P(e)/P—a promotion request, e.g., without eviction, P, precedes a promotion request with eviction 1250. Eviction overlap in this is not possible because when the preceding promotion request, P, is being executed the sectors being written to are detached (temporarily removed) from the use list and the free list and thus will not be evicted. The sectors written by the preceding promotion request, P, are moved to the head of the MVLV list after they are written.

6. P/P(e)—a promotion request, e.g., without eviction, follows a promotion request with eviction 1260. When the following promotion request, P, reaches the execute queue, there is a possibility that clusters specified in its SSD LBA cluster range may no longer be present in the flash, if these clusters were evicted by the preceding P(e) request. If the clusters are no longer present 1260, this may result in these clusters being written to the flash.

Figure 13:
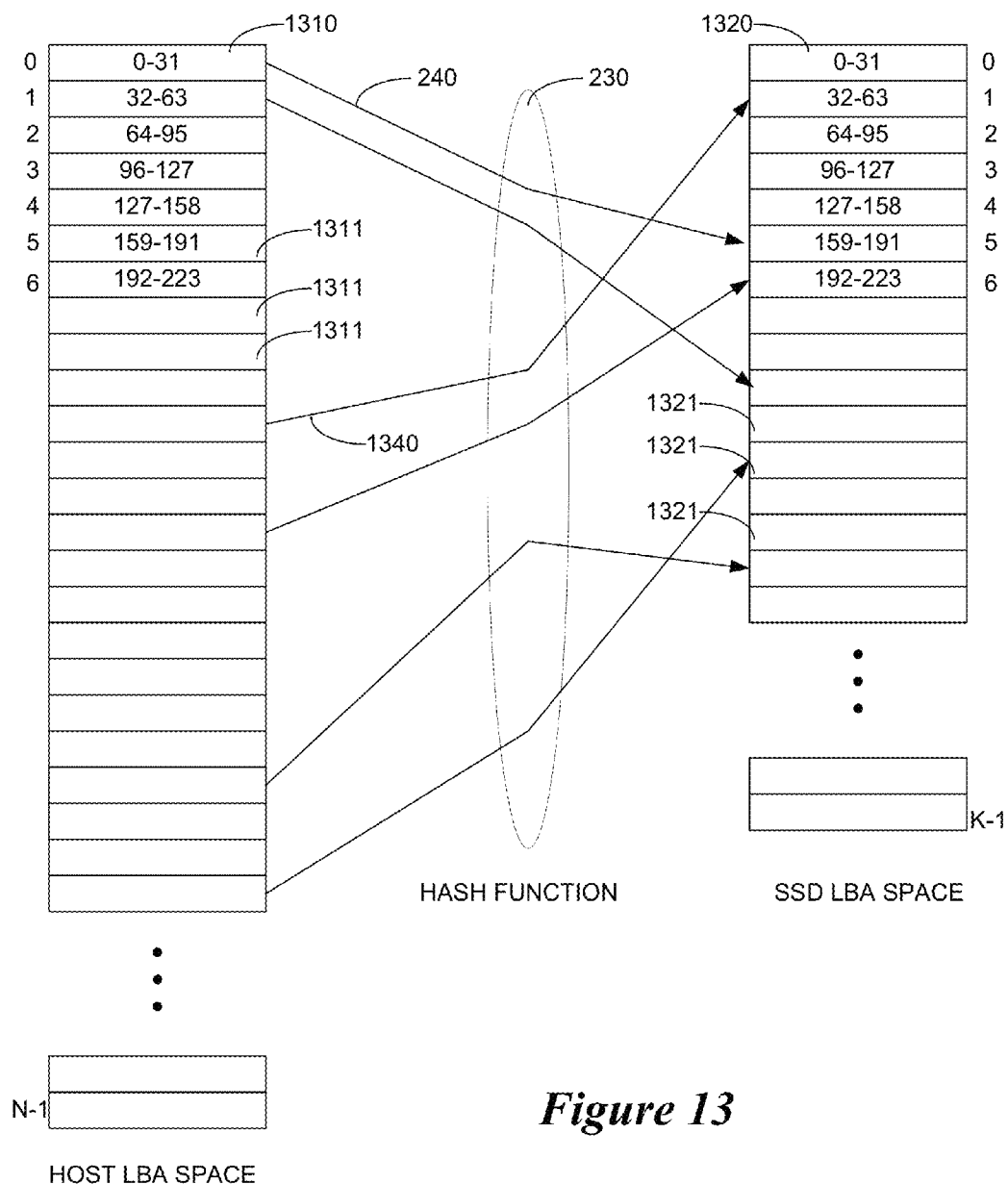
FIG. 13 illustrates a fully associative cache structure according to some embodiments.

The mapping of the host LBA clusters to the SSD clusters by the FCTM layer is fully associative meaning that any host LBA cluster can be mapped to any of the SSD LBA clusters, so long as there is room in the cache. FIG. 13 diagrammatically depicts mapping of the host LBA space 1310 to the SSD LBA space 1320. In the FCTM layer, the host LBA space is partitioned into clusters of host LBAs and the SSD LBA space is partitioned into clusters of SSD LBAs. In the host LBA space 1310 each cluster 1311 of host LBAs is uniquely identified by a number between 0 and N−1 and each cluster 1311 includes n contiguous sectors. In the SSD LBA space 1320, each SSD cluster 1321 is uniquely identified by a number between 0 and K−1 (K is typically less than N) and each cluster 1321 includes n sectors. The number of sectors per cluster, n, may be fixed and can depend on the size of a host sector, the geometry of the flash memory, the error correction code (ECC) used to store data in the flash memory, and/or other factors. In the example illustrated in FIG. 13, n=32, however, in other implementations, n may be greater than or less than 32. Furthermore, in general, n need not be a power of two.

The mapping from host LBA space 1310 to SSD LBA space 1320 is accomplished by a hash function 1330. As previously discussed, the hash function can support fully associative caching with regard to clusters. In other words, the hash function 1330 allows any host cluster 1311 to be mapped to any SSD cluster 321 as indicated by arrows 1340.

However, the mapping may be constrained such that any host LBA can exist in only one SSD cluster at any given time. The offset within a cluster where an LBA is located within a cluster is fixed and is can be determined by the host LBA modulo the number of host LBAs per cluster, i.e., the remainder resulting from dividing the host LBA by n. Allowing a host LBA cluster to be mapped into any SSD cluster and ensuring that promotes and invalidates implemented by the FCTM layer are aligned to cluster boundaries avoids cache fragmentation.

Figure 14:
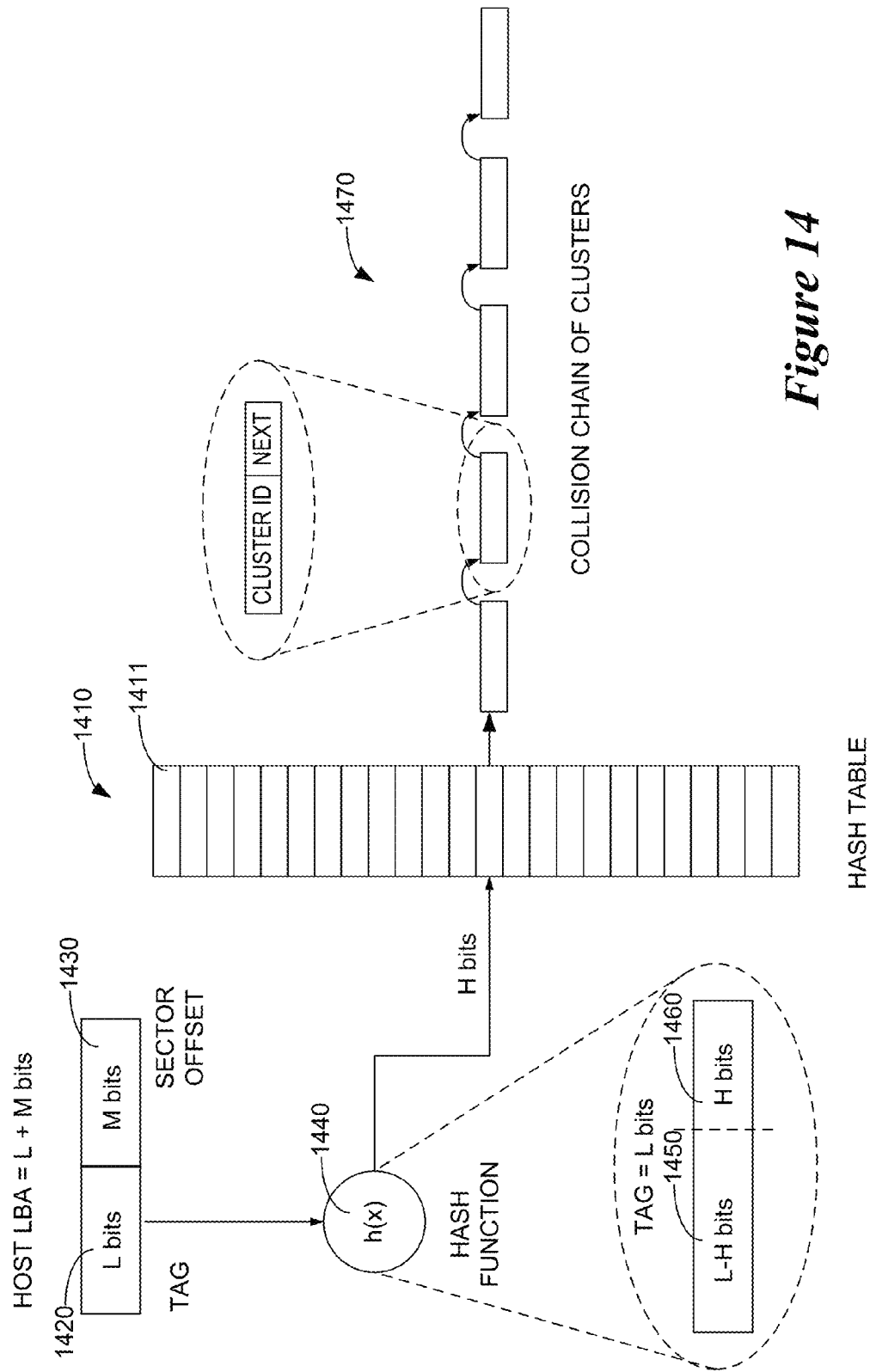
FIG. 14 illustrates a process of mapping host logical block addresses (LBAs) to cache LBAs in accordance with some embodiments.

FIG. 14 is a diagram that illustrates the implementation of the hash function which provides a process for keeping track of the host LBA clusters stored in the flash. In this example, the hash function 1440 is relatively simple, although more complex hash functions could be used. For most implementations, the hash function that is fastest is generally optimal. A hash table 1410 is used to keep track of the mapping of the host LBA space to the SSD space. A number, L, of the more significant bits 1420 of the host LBA are used as a tag to identify the corresponding cluster in the SSD LBA space. The remaining M less significant bits 1430 of the host LBA are used as a sector offset that identifies the sectors within the SSD cluster.

The hash function 1440 is used to convert the tag (upper L bits of the host LBA) into a hash table index in the hash table 1410. The entry in the hash table 1410 indicated by the hash table index 1411 (the tag converted by the hash function) points to one or more clusters in the SSD LBA space. For example, for a host LBA of L+M bits, the lower M bits can be used as a sector offset to identify the sector within an SSD cluster. The remaining L bits are used for the tag. The hash function 1440 operates on the tag 1420 to generate the index into the hash table 1410. For example, the hash function may discard the upper L-H bits 1450 of the tag and use the lower H bits as the hash table index. Discarding a portion of the tag means that in some cases a number of different host LBAs will map to the same entry 1411 in the hash table, and a collision will occur. An entry 1411 in the hash table 1410 is associated with more than one cluster identification (ID) only if a collision occurs. In this scenario, $2^M$ host LBAs mapped to a cluster will all have the same tag. If the hash function discards the upper bits leaving only H lower bits for the hash table index, the theoretical maximum number of possible collisions (i.e., the number of clusters that map into the same SSD LBA space) is $2^{(L-H)}$. The L-H bits of the tag identify the cluster ID. The collisions are resolved using a linked list 1470. The linked list contains the cluster IDs that are hashed to the same entry in the hash table (i.e., have the same hash index). To access a particular cluster, the linked list is scanned for an entry with the correct cluster ID. For example, when the FCI layer requests a look up involving a particular host LBA cluster, the FCTM layer applies the hash function, and if there is a collision (two clusters that map to the same space) then the FCTM layer traverses through the linked list to locate the requested cluster.

The above description assumes that the number of host sectors per cluster is a power of two. However, non-power of two sector sizes may also be used. A representative set of host sector sizes that are supportable by the fully associative cache structure described herein include, but is not limited to, the following sector sizes: 512, 520, 524, 528, 4096, 4192, and 4224 bytes. For example, based on sector to cluster mapping calculations, there may be 30 5XX byte sectors per cluster (assuming a cluster is 16 KB of the flash, such as an 8 KB flash page size with dual plane support).

Non-powers of two can be handled by modifying the mapping described above as follows: The tag is determined as tag=host LBA/sectors per cluster, where/indicates an integer division via truncation and the host sector offset within the cluster is determined by host LBA modulo the sectors per cluster, i.e., the remainder after dividing the host LBA by the sectors per cluster.

The division and modulo operations can be implemented by executing a multiply instruction, e.g., a 64 bit multiply instruction on the FCTM processor, assuming the FCTM processor supports 64 bit multiple instructions. To facilitate the multiply, the value p=0xFFFFFFFF/sectors per cluster is pre-computed—is a constant value. The tag is now determined by tag=(host LBA*p)>>32, where * indicates a 64 bit multiply operation and where >>32 means that the result of (host LBA*p) is right shifted 32 times. Using this process, there is a possibility that the tag is off by one. To correct for this occurrence, the tag is incremented by one if the following condition is satisfied: (Host LBA—tag*sectors per cluster≥sector per cluster. The remainder can be similarly determined.

It is to be understood that this detailed description is illustrative only, and various additions and/or modifications may be made to these embodiments, especially in matters of structure and arrangements of parts and/or processes. Accordingly, the scope of the present disclosure should not be limited by the particular embodiments described above, but should be defined by the claims set forth below and equivalents thereof.

What is claimed is:

1. A device, comprising:
a hybrid controller configured to manage data transfers between a host processor and a secondary memory, the secondary memory configured to serve as a cache for a primary memory, the primary memory including a memory space corresponding to host logical block addresses (LBAs), the hybrid controller configured to
receive incoming memory access requests from the host processor, the memory access requests including a range of host LBAs, the memory access requests comprising:
   read requests, each read request respectively including a host LBA range;
   promotion requests, each promotion request respectively including a host LBA range that is aligned to secondary memory LBA clusters; and
   invalidate requests, each invalidate request respectively including a host LBA range that is aligned to secondary memory LBA clusters;
route the incoming memory access requests to a set of incoming queues, the set of incoming queues comprising an incoming free queue containing a number of incoming nodes;
map the range of host LBAs into clusters of secondary memory LBAs;
transform each incoming memory access request into one or more outgoing memory access requests, each outgoing memory access request including a range or cluster of secondary memory LBAs;
route the outgoing memory access requests from the incoming queues into a set of outgoing queues, the set of outgoing queues comprising a set of outgoing execute queues and an outgoing free queue that includes a number of outgoing nodes;
use an outgoing node to store data about the outgoing memory access request;

make the outgoing node that stores the data about the outgoing memory access request unavailable to store data about other outgoing memory access requests;

return the outgoing node to the outgoing free queue after at least a portion of the outgoing memory access request has been executed; and access the secondary memory using the outgoing memory access requests.

2. The device of claim 1, wherein the incoming queues include one or more of:

a receive queue configured to queue the incoming memory access requests;

a set of ready queues, each ready queue of the set of ready queues configured to queue memory access requests that are ready for execution, the set of ready queues comprising:

a read ready queue configured to queue incoming read requests;

a promotion ready queue configured to queue incoming promotion requests; and an invalidate ready queue configured to queue invalidate requests;

an overlap queue configured to queue incoming memory access requests having a host LBA range that overlaps with a host LBA range of other data access requests; and an execute queue configured to queue incoming memory access requests that are being executed.

3. The device of claim 1, wherein the set of outgoing queues comprises a set of outgoing execute queues, wherein each entry in the incoming execute queue is associated with a plurality of entries in an outgoing execute queue.

4. The controller of claim 3, wherein the set of outgoing queues comprises an outgoing free queue containing a number outgoing nodes wherein an outgoing node is removed from the outgoing free queue when an outgoing memory access request is queued in one of the outgoing execute queues and the outgoing node is returned to the outgoing free queue.

5. A method of operating a hybrid memory system that includes a primary memory and a secondary memory, the method comprising:

routing incoming memory access requests in a set of incoming queues, the set of incoming queues comprising:

an incoming free queue containing a number of incoming nodes;

a receive queue configured to queue each of the incoming memory access requests;

a set of ready queues, each ready queue of the set of ready queues configured to queue memory access requests that are waiting for execution, the set of ready queues comprising:

a read ready queue configured to queue read requests;

a promotion ready queue configured to queue promotion requests; and an invalidate ready queue configured to queue invalidate requests;

an execute queue configured to queue data access requests that are being executed; and an overlap queue configured to queue each memory access request having a host LBA range that overlaps with a host LBA range of a memory access request in the set of ready queues or the execute queue, the incoming memory access requests comprising a range of host logical block addresses (LBAs) that correspond to a memory space of the primary memory, the memory access requests comprising:

read requests, each read request respectively including a host LBA range;

promotion requests, each promotion request respectively including a host LBA range that is aligned to secondary memory LBA clusters; and invalidate requests, each invalidate request respectively including a host LBA range that is aligned to secondary memory LBA clusters;

mapping the host LBA range to clusters of secondary memory LBAs, the secondary memory LBAs corresponding to a memory space of the secondary memory;

transforming each incoming memory access request queued in the set of incoming queues into one or more outgoing memory access requests, the outgoing memory comprising a range of secondary memory LBAs or one or more clusters of secondary memory LBAs;

routing the one or more outgoing memory access requests in a set of outgoing queues; and accessing the secondary memory using the outgoing memory access requests.

6. The method of claim 5, wherein routing the incoming memory access requests comprises implementing a priority scheme for routing the memory access requests in the set of incoming queues, the priority scheme including routing memory access requests that take smaller amount time to execute before routing memory access request that take a larger amount of time to execute.

7. The method of claim 5, wherein routing the incoming memory access requests in the set of incoming queues comprises routing one or more of requests to read a host LBA range from the secondary memory, requests to promote a host LBA range to the secondary memory, and requests to invalidate a host LBA range in the secondary memory.

8. The method of claim 5, wherein routing the incoming memory access requests comprises implementing a priority scheme for routing the incoming memory access requests comprising:

routing invalidate requests in the invalidate ready queue to the execute queue as a first priority;

routing read requests in the read ready queue to the execute queue as a second priority; and routing promotion requests in the promotion ready queue as a third priority.

9. The method of claim 5, wherein routing the incoming memory access requests in the incoming queues comprises routing a read request into the execute queue only if the secondary memory LBA range corresponding to the host LBA range of the read request is fully present in the secondary memory.

10. The method of claim 5, wherein routing the incoming memory access requests in incoming queues comprises routing an invalidate request into the execute queue and adding the secondary memory LBA clusters associated with the invalidate request to a list of free clusters.

11. The method of claim 5, wherein routing the incoming memory access requests in the incoming queues includes routing a promotion request from the promotion ready queue to the execute queue comprising:

determining if secondary memory LBA clusters corresponding to the host LBA range of the promotion request are present in the secondary memory;

forming a bitmap to skip promotion of the secondary memory LBA clusters that are present in the secondary memory;

determining if a sufficient number of secondary memory LBA clusters are available for implementation of the promotion request; and if the sufficient number of secondary memory LBA clusters are not available, evicting secondary memory LBA clusters.

12. The method of claim 11, further comprising identifying least valuable secondary memory LBA clusters, wherein evicting the secondary memory LBA clusters comprises evicting the least valuable secondary memory clusters.

13. A controller system for a hybrid memory system, the controller comprising:

a hybrid controller configured to manage data transfers between a host processor and a flash memory, the flash memory configured to serve as a cache for a magnetic disk, the magnetic disk including a memory space corresponding to host logical block addresses (LBAs), the hybrid controller configured to the hybrid controller configured to:

receive the incoming memory access requests from a higher layer of the hybrid controller, the memory access requests comprising:

read requests, each read request respectively including a host LBA range;

promotion requests, each promotion request respectively including a host LBA range that is aligned to flash memory LBA clusters; and invalidate requests, each invalidate request respectively including a host LBA range that is aligned to flash memory LBA clusters;

route the incoming data access requests in a set of incoming queue comprising:

generating an error message if there are no free nodes in the incoming free queue;

routing an incoming memory access request to the receive queue if there is an available node in the incoming free queue;

using an incoming node to store data about the incoming memory access request;

making the incoming node that stores the data about the incoming memory access request unavailable to store data about other incoming memory access requests; and returning the incoming node to the incoming free queue after at least a portion of the incoming memory access request has been executed;

transform each of the memory access requests from the set of incoming queues into a plurality of outgoing memory access requests;

route the plurality of outgoing memory access requests in a set of outgoing queues; and send the outgoing memory access requests to a lower layer of the hybrid controller.

14. The controller of claim 13, wherein the hybrid controller is configured to manage the queues using a single code thread.

15. The controller of claim 13, wherein the incoming and outgoing queues are only accessible by a flash control and transfer management (FCTM) layer of the hybrid controller.

* * * * *